US010057498B1

(12) United States Patent
Nunnink et al.

(10) Patent No.: US 10,057,498 B1
(45) Date of Patent: Aug. 21, 2018

(54) LIGHT FIELD VISION SYSTEM CAMERA AND METHODS FOR USING THE SAME

(71) Applicant: Cognex Corporation, Natick, MA (US)

(72) Inventors: Laurens Nunnink, Simpleveld (NL); William Equitz, Brookline, MA (US); David J. Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 261 days.

(21) Appl. No.: 13/834,440

(22) Filed: Mar. 15, 2013

(51) Int. Cl.
*H04N 5/235* (2006.01)

(52) U.S. Cl.
CPC .................... *H04N 5/235* (2013.01)

(58) Field of Classification Search
CPC ............. H04N 5/2254; H04N 5/23212; H04N 5/23229; H04N 13/0232; H04N 9/045; H04N 5/2355; H04N 19/105; H04N 19/12; H04N 19/14; H04N 19/182; H04N 19/184; H04N 19/46; H04N 19/91; H04N 19/93; H04N 5/02; H04N 5/23245; H04N 13/0217; H04N 13/0239; H04N 13/0242; H04N 13/0271; H04N 5/2226; H04N 5/23232; H04N 5/23293; G02B 3/0056; G02B 3/0006; G02B 5/045; G02B 3/005; G02B 27/0025; G02B 27/0075; G03B 35/08; G03B 35/24; G03B 35/10; G03B 11/00; G03B 17/00; G06T 15/205; G06T 19/003; G06T 2200/21; G06T 2207/10052;

(Continued)

(56) References Cited

U.S. PATENT DOCUMENTS 3,652,784 A * 3/1972 Wupper ............. H04N 5/23212
                                              348/270
4,404,595 A * 9/1983 Ushiro ..................... G03B 3/10
                                              348/348

(Continued)

FOREIGN PATENT DOCUMENTS

EP         2244484 B1     3/2012

OTHER PUBLICATIONS

Ng, "Light Field Photography with a Hand-held Plenoptic Camera," Standford Tech Report CTSR (2005).*

(Continued)

*Primary Examiner* — Jay Patel
*Assistant Examiner* — Shadan E Haghani
(74) *Attorney, Agent, or Firm* — Loginov IP

(57) ABSTRACT

This invention provides a vision system camera assembly and method for using the same that employs a light-field camera with an associated vision system image sensor and overlying microlens optics to acquire images of a scene. The camera generates a light field allowing object features at varying depths of field to be clearly imaged in a concurrent manner. In an illustrative embodiment a vision system, and associated method of use thereof, which images an object or other subject in a scene includes a vision system camera with an optics assembly and a light field sensor assembly. The camera is constructed and arranged to generate light field image data from light received through the optics assembly. A light field process analyzes the light field image data and that generates selected image information. A vision system processor then operates a vision system process on the selected image information to generate results therefrom.

17 Claims, 20 Drawing Sheets

(58) Field of Classification Search
CPC ... G06T 3/4053; G06T 7/0018; G06T 1/0007; G06T 2207/10016; G06T 2207/10021
See application file for complete search history.

(56) References Cited

U.S. PATENT DOCUMENTS

| | | | |
|---|---|---|---|
| 5,644,412 A | 7/1997 | Yamazaki et al. | |
| 5,912,934 A * | 6/1999 | Acks | G21C 19/02 376/248 |
| 5,917,936 A * | 6/1999 | Katto | G06K 9/00234 382/154 |
| 5,933,668 A * | 8/1999 | Hyers | G03B 15/00 348/E5.051 |
| 6,009,188 A * | 12/1999 | Cohen et al. | 382/154 |
| 7,172,124 B2 | 2/2007 | Wang et al. | |
| 7,213,761 B2 | 5/2007 | Liu | |
| 7,305,146 B2 | 12/2007 | Cheatle | |
| 7,436,429 B2 | 10/2008 | Tillotson | |
| 7,492,378 B2 | 2/2009 | Nishino et al. | |
| 7,680,411 B2 | 3/2010 | Ye | |
| 7,792,423 B2 | 9/2010 | Raskar et al. | |
| 7,918,398 B2 | 4/2011 | Li et al. | |
| 7,936,392 B2 | 5/2011 | Ng et al. | |
| 7,949,241 B2 | 5/2011 | Petit | |
| 7,949,252 B1 | 5/2011 | Georgiev | |
| 7,965,936 B2 | 6/2011 | Raskar et al. | |
| 8,059,262 B2 | 11/2011 | Yamazoe | |
| 8,289,440 B2 | 10/2012 | Knight et al. | |
| 8,290,358 B1 * | 10/2012 | Georgiev | 396/326 |
| 8,628,014 B1 * | 1/2014 | Hoffer, Jr. | G06K 7/10712 235/462.01 |
| 9,135,543 B2 * | 9/2015 | Lancaster-Larocque | G06K 19/06178 |
| 2002/0039492 A1 * | 4/2002 | Chen | H04N 1/2112 396/429 |
| 2007/0040032 A1 | 2/2007 | Molteni | |
| 2007/0131772 A1 | 6/2007 | Lubow | |
| 2007/0230944 A1 * | 10/2007 | Georgiev | 396/322 |
| 2007/0252074 A1 * | 11/2007 | Ng | G02B 3/0056 250/208.1 |
| 2008/0187305 A1 * | 8/2008 | Raskar | G02B 27/0075 396/268 |
| 2009/0174765 A1 * | 7/2009 | Namba | G02B 3/14 348/46 |
| 2010/0128145 A1 * | 5/2010 | Pitts | H04N 5/23212 348/231.99 |
| 2011/0128412 A1 * | 6/2011 | Milnes | G02B 27/22 348/231.99 |
| 2011/0234841 A1 | 9/2011 | Akeley et al. | |
| 2012/0048941 A1 | 3/2012 | Wang | |
| 2012/0050562 A1 | 3/2012 | Perwass et al. | |
| 2013/0048722 A1 * | 2/2013 | Davis et al. | 235/383 |
| 2013/0223673 A1 * | 8/2013 | Davis et al. | 382/100 |
| 2013/0265485 A1 * | 10/2013 | Kang | H04N 5/225 348/360 |

OTHER PUBLICATIONS

Levoy, et al., "Light Field Rendering", "Proc SIGGRRAPH", 1996, Published in: US.

* cited by examiner

LIGHT FIELD VISION SYSTEM CAMERA AND METHODS FOR USING THE SAME

FIELD OF THE INVENTION

This invention relates to machine vision system cameras and methods for constructing and using the same.

BACKGROUND OF THE INVENTION

Machine vision systems are used in a wide range of manufacturing processes. Among other uses, machine vision is employed to ensure quality and to assist in the constructing various articles and devices. A common use for vision systems in industrial applications is in association with an inspection or assembly location on a moving production line. Images of objects are acquired as they pass under the vision system camera's field of view. Based upon image data acquired, the vision system can decide whether there is a flaw in the object, determine its alignment for further processes, operate a robot manipulator, identify and sort the object into an appropriate bin, or perform other automated tasks.

Another common vision system task is the measurement, inspection, alignment of objects and/or decoding of symbology (e.g. bar codes), which are used in a wide range of applications and industries. These systems are typically based around the use of an image sensor, which acquires images (typically grayscale or color, and in one, two or three dimensions) of the subject or object, and processes these acquired images using an on-board or interconnected vision system processor. The processor generally includes both processing hardware and non-transitory computer-readable program instructions that perform one or more vision system processes to generate a desired output based upon the image's processed information. This image information is typically provided within an array of image pixels each having various colors and/or intensities. In the example of a symbology (barcode of "ID") reader, the user or automated process acquires an image of an object that is believed to contain one or more IDs/codes. The image is processed to identify ID/code features, which are then decoded by a decoding process and/or processor obtain the inherent alphanumeric data represented by the code.

Often, a vision system camera includes an internal processor and other components that allow it to act as a standalone unit, providing a desired output data (e.g. decoded ID/code information, alignment and pose information, tracking, defect-finding and the like) to a downstream process, such as an inventory tracking computer system or manufacturing control device. Alternatively, vision system tasks can be performed using appropriate tools and processes running on a remote processor (e.g. a standalone PC or server), and the camera assembly operates primarily to capture and transfer image data to the remote processor. The camera assembly also typically contains a lens mount, such as the commonly used C-mount, that is capable of receiving a variety of lens configurations so that it can be adapted to the specific vision system task.

In imaging IDs/codes and other visual information on an object (often passing down a conveyor line), the focal distance of the object of interest often changes—for example where differing sized boxes pass under a vision system camera. One approach to resolving the correct focal distance to capture the clearest, sharpest image of region of interest on an object in a conventional camera using, for example, a standard lens that projects directly onto a sensor pixel array is to employ a lens assembly with automatic focusing (auto-focus) function. A variety of auto-focus assemblies are presently available. Some electro-mechanically alter the distance between lenses to accommodate differing focal distance. Alternatively, an auto-focus lens can be facilitated by a so-called liquid lens assembly. One form of liquid lens uses two iso-density liquids—oil is an insulator while water is a conductor. The variation of voltage passed through the lens by surrounding circuitry leads to a change of curvature of the liquid-liquid interface, which in turn leads to a change of the focal length of the lens. Some significant advantages in the use of a liquid lens are the lens' ruggedness (it is free of mechanical moving parts), its fast response times, its relatively good optical quality, and its low power consumption and size. Relative to other autofocus mechanisms, the liquid lens also exhibits extremely fast response times.

Nevertheless, a liquid lens, like other auto-focus mechanisms, exhibits a delay in changing focal distance. This can be disadvantageous where the object is passing through the imaged scene at relative speed. The lens may lack sufficient time to refocus onto the next object as it arrives at the scene. Likewise, various regions of interest on a single object may be located at differing focal distances, causing only some regions to be clearly imaged, and potentially missing important visual information.

One option to enable an object to be imaged over a longer focal range to is to employ a camera assembly having optics characterized by extended depth of field (EDOF), or "full focus", characteristics. In such cameras the focal distance is typically short and thereafter extends to infinity. Often such systems employ a small aperture that receives reduced light. Such systems are often inefficient for use in a vision system application, particularly where object illumination may be unpredictable or limited. In addition acquired images may not be as sharp as those produced with an adjustable focus, larger-aperture lens, again posing a disadvantage in a vision system application where sharply defined edges can be highly desirable. Moreover, it is sometimes desirable to distinguish between in-focus and out-of-focus areas on an object, which is problematic with conventional EDOF cameras.

SUMMARY OF THE INVENTION

This invention overcomes disadvantages of the prior art by providing a vision system camera assembly and method for using the same that employs a light-field camera with an associated vision system image sensor (imager) and overlying microlens optics to acquire images of a scene. The light field camera generates a light field that allows object features at varying depths of field to be clearly imaged in a concurrent manner. In an illustrative embodiment a vision system, and associated method of use thereof, which images an object or other subject in a scene includes a vision system camera with an optics assembly and a light field sensor assembly. The camera is constructed and arranged to generate light field image data from light received through the optics assembly. A light field process analyzes the light field image data and that generates selected image information. A vision system processor then operates a vision system process on the selected image information to generate results therefrom. The light field sensor assembly includes a microlens structure overlying a sensor pixel array or can define another type of "microlens" structure, such as an array of pinholes. Illustratively, the selected image information comprises a focused image in an extended depth of field which can be subjected to further vision system processes, such as alignment, inspection, ID/code-reading, robot manipulator control, 2D and 3D pattern recognition, profiling, etc. Notably, the selected image information can comprise focused image information of features located at a selected focal distance (corresponding, for example, to a certain height with respect to the imaged object's or the surrounding scene's reference plane), while other information outside of the selected focal distance (and outside of the object height of interest) is unfocused and ignored/omitted from the vision system process. Alternatively, the image information consists of features at a certain distance on the optical axis from the image plane (with the optical axis defining either a perpendicular or non-perpendicular angle with respect to an intersection with the imaged object surface). The features can more particularly comprise layered features at each of a plurality of heights with respect to the imaged object in an at least partially overlapping arrangement. Illustratively, the layered features can be overlapping ID/code features (e.g. a 2D or 3D code). Likewise, the features can define a portion of the object having a region of interest in the vision system process.

In further embodiments, the features define a portion of the object having a region of interest in the vision system process. The selected image information can comprise image information of features of the object from at least a first point of view, selected of a range of points of view. This point of view can be selected to filter out at least one undesirable optical feature. The undesirable optical feature can be based upon specularity, shadowing, occlusion or other optical aberrations—typically that result from the viewing and/or illumination angle. The selected image information can also comprise image information of features of the object from at least a second point of view, selected from the range of points of view. 3D depth information can be generated based upon the selected first point of view and the selected second point of view. More generally, the selected image information can comprise filtered image information that is selected to be free of some or all undesirable optical effects (e.g. specularity, shadowing, occlusion, etc.). Also, generally, the vision system process can include an ID-reading and ID-decoding process, and the system can define an ID reader, with an associated ID-reading method. An ID-reader housing can be provided. This housing is constructed and arranged to be handheld (or fixed mount) and containing the optics, the sensor assembly and at least a portion of the vision system processor. Illustratively, the vision system process can include an OCR process that operates to decode raised characters. In various applications, the object can include a surface that defines a tilt with respect to the camera optical axis, and the selected image information includes image information that resolves the surface tilt into an arbitrary 2D orientation. This image information can provide perspective that allows correction for the tilt when performing a task such as manipulation, alignment, registration, etc.

In another embodiment, a conventional sensor assembly that acquires an image of the object, the sensor assembly that generates conventional image data, the conventional image data being processed based upon range data contained in the selected image information. Illustratively, the conventional image data is higher in resolution than image data generated by the light field sensor assembly. In illustrative embodiments, the selected image information includes a 3D model of at least a portion of the object. In further embodiments the selected image information includes information defining a reduced aperture with respect to a full available aperture for the light field image data. This reduced aperture "setting" enables, for example, higher depth of field, reduced light (i.e. brightness control) and exposure control in "software" using the light field process.

In an illustrative embodiment, the object the selected image information is a focused image of a structured light projected on a surface of the object. This can provide a structured light (e.g. laser) profiler arrangement that is free of a complex optical assembly to account for the focal variation resulting from angle of the image plane of the sensor with respect to the surface and laser line. Notably, in the illustrative profiler arrangement, the selected image information includes information on a plurality of points of view of the surface from a range of points of view, the plurality of points of view reducing occlusion of line features. More generally, structured light can be provided, for example, in the form of a laser line/fan as used in a profiler, or in the form of a dot or other defined shape as used, for example, in an aimer. In the case of an aimer, the system can determine relative distance based upon the imaged location of an aiming dot as it is brought into focus by the light field process.

In an illustrative embodiment the light field sensor assembly is constructed and arranged to be removably attached to and operatively connected with the camera assembly, and further comprising a conventional sensor assembly constructed and arranged to be removably attached to and operatively connected with the camera assembly. This provides a modular camera arrangement that can operate using a variety of sensor types. The vision processor can be adapted to recognize and interoperate with the attached sensor type, performing processes appropriate thereto, including light field processes. In an embodiment, the sensor can be integrally mated to the optics assembly as a single lens module.

BRIEF DESCRIPTION OF THE DRAWINGS

The invention description below refers to the accompanying drawings, of which.

DETAILED DESCRIPTION

I. System Overview and Light Field Camera

Figure 1:
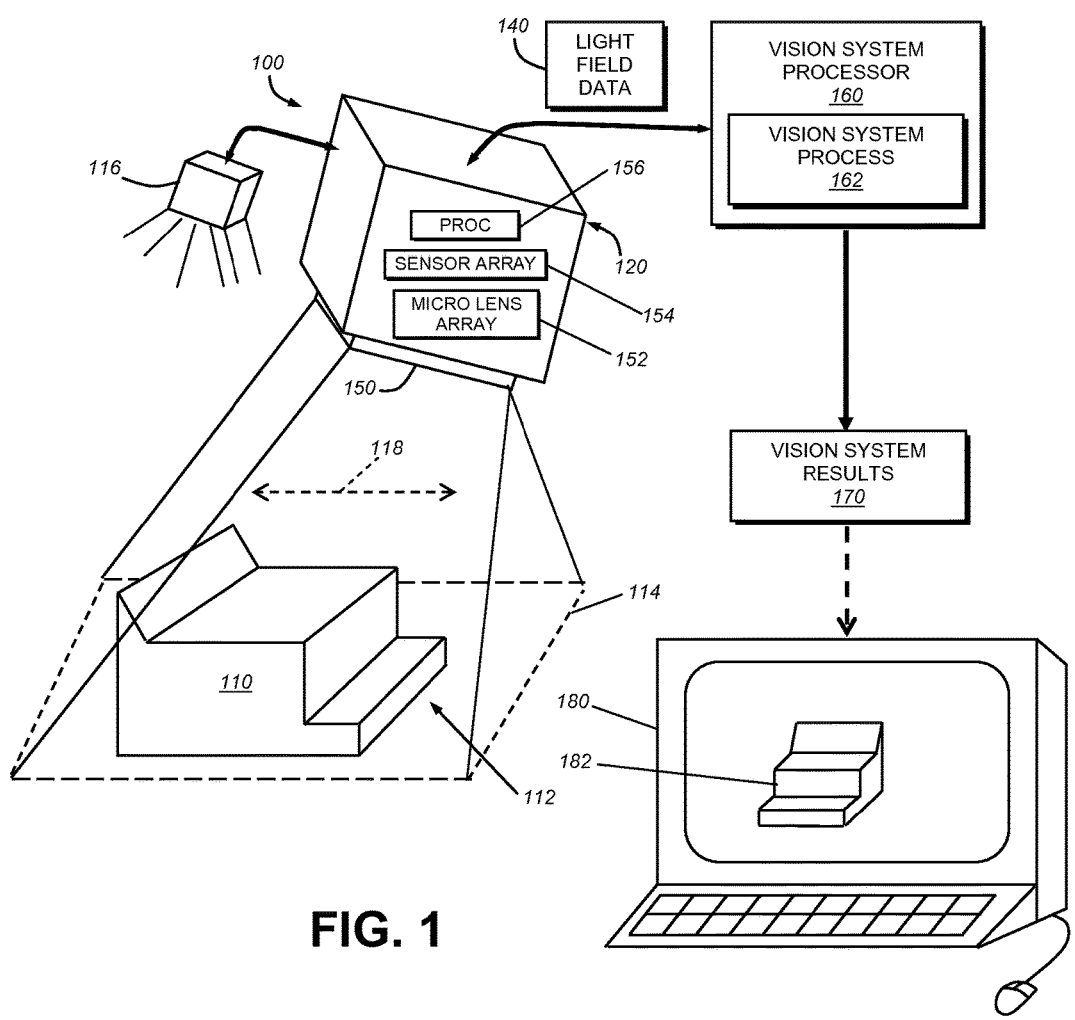
FIG. 1 is a diagram of an illustrative vision system arrangement in which a light field camera acquires a light field image of an object and transmits the data to a vision system processor/process.

FIG. 1 depicts a machine vision system (simply termed a "vision system") arrangement 100 that images an exemplary object 110 within a scene 112. The vision system arrangement includes a camera assembly 120 that images a field of view 114 within the scene 112. An illumination device 116 of any acceptable type (e.g. an external strobe illuminator, LED ring illuminator, etc.) provides light to the scene when images are acquired. The object 110 and camera assembly can be located in a stationary relationship with respect to each other, or alternatively, the camera and object can be in relative motion, as indicated by dashed arrow 118. The camera assembly 120, which is described in further detail below, comprises a so-called "light field camera." The light field camera assembly 120 generates an image containing "light field data" 140. This light field data 140 is provided by a unique optical system that in this example is generated using a conventional lens assembly 150 that focuses light from the scene 112 onto a microlens array 152. The microlens array 152, in turn focuses a large number of individual ray patterns onto the pixel array of an image sensor 154. This image sensor delivers its image data (grayscale or color) to a processor/memory 156 from which the image data is transmitted to on onboard or remote vision system processor 160 running one or more vision system processes 162 that are adapted to interpret the light field data 140 into useful vision system information. This information can be used for a variety of tasks, such as 2D or 3D pattern recognition, object alignment, object inspection, robot manipulation, and/or symbol/code reading (e.g. two-dimensional (2D) or three-dimensional (3D) codes, QR codes, DotCode, Data-Matrix codes, etc.). This information is output as vision system results 170 that are delivered to a downstream data handling system (e.g. inventory tracking systems), and/or used to perform concurrent tasks, such as part rejection, production-line stoppage, issuance of audible and/or visible defect alarms, robot arm movement, and the like.

As shown in FIG. 1, the image information can be displayed by an appropriate display device (e.g. a PC, laptop, "smart phone", computing tablet, or other data processing device) 180. Notably, the use of a light field camera arrangement allows the generation of a set of image data in which each pixel of the image is brought into desired focus. In an exemplary implementation, this allows the overall image to be sharply focused regardless of the prevailing depth of field. Thus, as shown in the display 180, the image 182 of object 110 appears fully in focus despite numerous height and angle variations that would often cause at least part of the image to be out of focus due to varying distance for the camera's image plane. Moreover, effects of shadowing and the like can be compensated-for, providing an image that appears more complete and detailed over the entire field of view.

Note, as used herein the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software.

Figure 2:
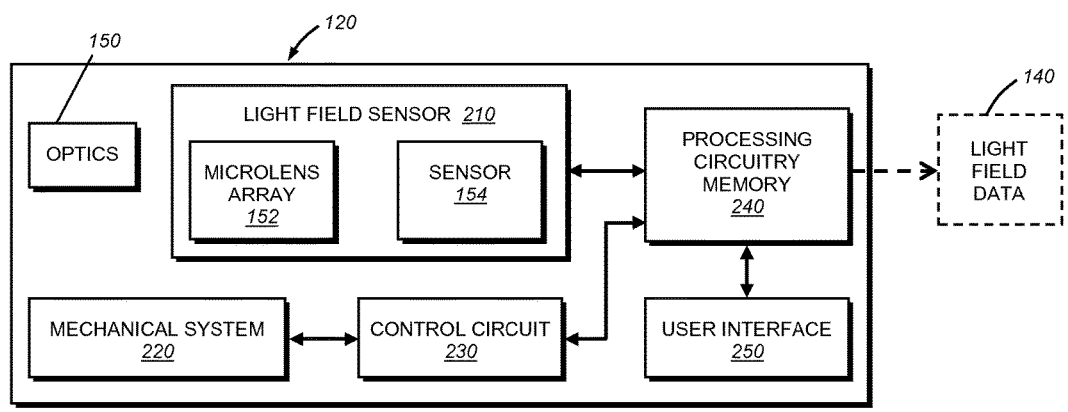
FIG. 2 is a block diagram showing the components and associated functions of an exemplary light field camera for use in the arrangement of FIG. 1.
Figure 3:
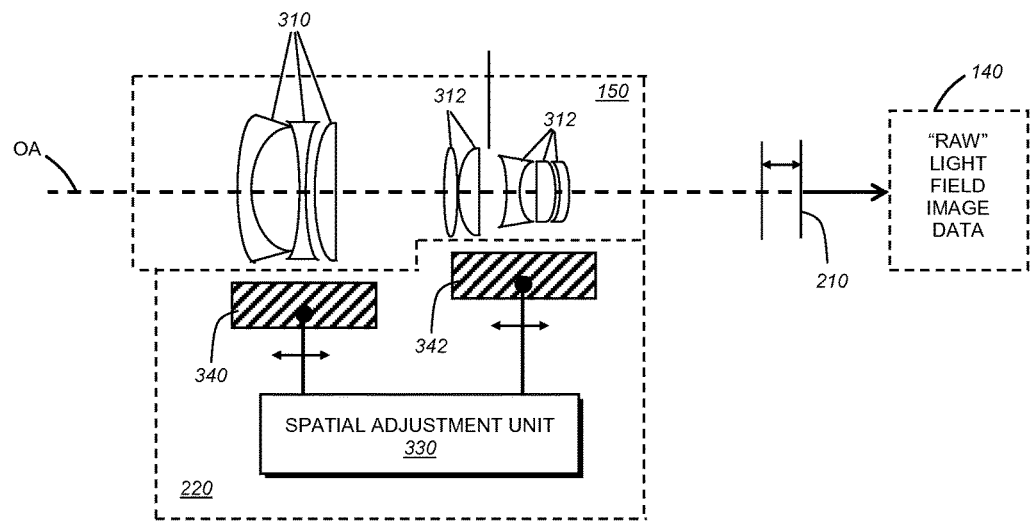
FIG. 3 is a schematic diagram of the physical components that generate light field image data in the light field camera of FIGS. 1 and 2.

By way of example, the light field camera assembly 120 is implemented based upon the commercially available Lytro™ camera available from Lytro, Inc. of Mountain View, Calif. With further reference to FIGS. 2 and 3, the structure and function of the camera 120 is depicted schematically. By way of useful background information, a description of the camera is provided in U.S. Pat. No. 8,289,440, entitled LIGHT FIELD DATA ACQUISITION DEVICES, AND METHODS OF USING AND MANUFACTURING THE SAME, by Knight, et al., the teachings of which are incorporated herein by reference. While the Lytro™ is presently available as a standalone consumer-based unit, it is contemplated that the camera can be modified or purpose-built to operate in the vision system arrangement 100 described herein. As shown in FIG. 2, the camera the above-described optics package 150 (one or more "focus" lenses) that focuses light from the imaged scene onto a light field sensor assembly 210. This assembly 210 includes the above-described microlens array 152 and image sensor (pixel array) 154. The optics assembly in this example is moved to vary zoom using a mechanical system 220, which can include appropriate electromechanical actuators under the control of an associated control circuit 230. The control circuit 230 is linked to a main processor assembly and associated memory (i.e. a data memory and a program memory) 240. The processor handles received image data from the sensor 154 and transmits it as light field data 140 that can be displayed and/or employed in the above-described vision system processor/process (160/162). A user interface 250 is provided in association with the processor assembly 240 to control various camera functions including image acquisition, zoom, etc. The user interface can include a conventional communication protocol, such as USB, allowing the camera to be linked to a remote processing device, such as a PC. In an embodiment, the PC can include the vision system processes used to manipulate the light field data. The commercial implementation of the camera delivers light field data that has been processed (described below) to deliver a particular type (or types) of image with full depth of field. For the purposes of performing vision system tasks, "raw" light field image data can be employed as the light field data 140 delivered to the vision system processor/process.

As shown in FIG. 3, the optics package 150 includes a plurality of lenses 310 and 312 in a pair of movable groupings. The depicted geometry and power of the various lenses is illustrative of a wide variety of potential arrangements. The lenses are arranged in the exemplary implementation to provide a variable zoom function to the camera. More generally the lenses ensure that light from the selected field of view is properly focused on the full area of the sensor assembly 210 at all selected zoom settings. The mechanical system 220, thus, includes a spatial adjustment unit 330 with discrete actuators 340 and 342 to move each grouping of lenses 310 and 312, respectively, along the optical axis OA. The sensor assembly 210 defines a panel that includes the microlens array imposed over the image sensor pixel array.

Figure 4:
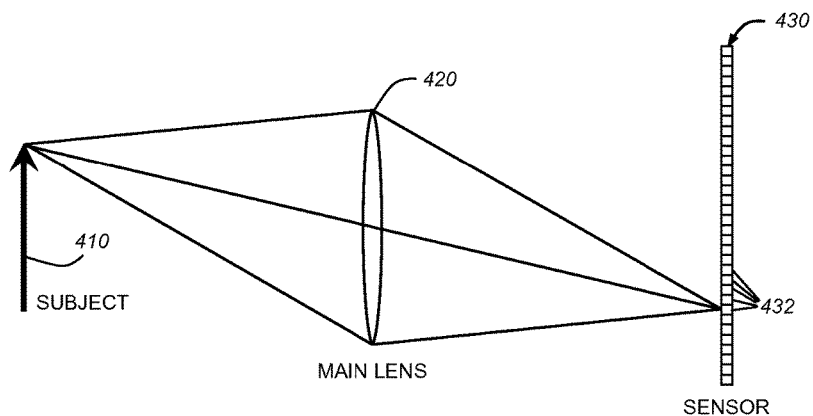
FIG. 4 is a diagram showing acquisition of an image using conventional optics and a conventional image sensor pixel array according to a prior art implementation.
Figure 5:
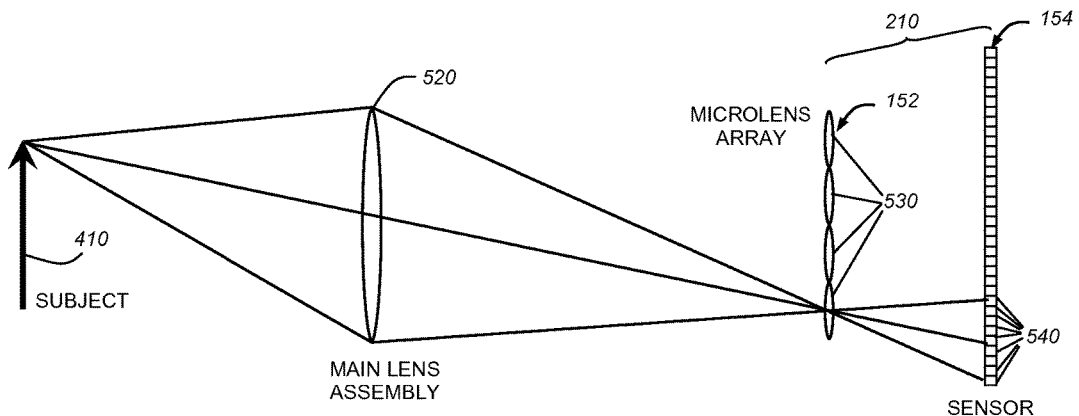
FIG. 5 is a diagram showing acquisition of a light field image using a microlens array and associated image sensor according to the exemplary light field camera arrangement of FIGS. 1-3.

With further reference to FIGS. 4 and 5, the function of the sensor assembly 210 is described in further detail. By way of background, and as shown in FIG. 4, a conventional camera focuses light from an object/subject 410 through a lens (or plurality of lenses) 420 onto a point of the image sensor 430. The focused point of light is received by at least one pixel 432 in the sensor array. The pixel can read grayscale intensity, or can include a color mask that reads a certain color wavelength (e.g. red, green or blue (RGB)). This pixel generates a pixel value (e.g. a grayscale intensity value or a color value) based on the light received at the pixel. The array of pixels generates associated color or grayscale intensity values for all locations of the entire field of view as it is transmitted across the area of the array by the lens 420. Conversely, as shown in FIG. 5, the lens assembly 520 of the light field camera focuses light onto each of a plurality of microlenses 530. As shown, each focused point of light is then spread as shown over a plurality of pixels 540 in an area extending in each of two orthogonal directions. This generates a "light field" with respect to each received point of light. In the exemplary Lytro™ camera, the sensor assembly comprises an array of 221×221 microlenses. Each of these microlenses is sized and arranged to spread light onto a sub-array of 15×15 pixels in an overall sensor array of approximately 4K×4K pixels. The full pixel array thus represents light from a variety of perspectives and focal distances based upon the variation provided by each microlens to its respective 15×15 pixel sub-array. By manipulating this "raw" light field image data (350 in FIG. 3) from the sensor, the camera's processing circuitry/memory 240 can use proprietary algorithms to determine the information that delivers the best focus for each pixel in a final image of the object, and thereby generate a desired extended depth of field image.

According to an illustrative embodiment and based upon instructions provided to the processing circuitry/memory (for example via an appropriate application program interface (API)), the camera can be adapted to transmit the raw light field image data or a preprocessed version thereof to the vision system processor/process where it is further manipulated to facilitate a variety of vision system applications, tasks and results. This is described in further detail below.

It should be noted, and is expressly contemplated, that the above-described implementation of a light field camera is exemplary of a variety of commercially available arrangements that can be substituted therewith to obtain raw or preprocessed light field image data of a scene and/or object in the scene. For example, a variety of types of light field cameras are available from Raytrix GmbH of Germany. For example, technology based upon camera models R1, R5, R11 and/or R29 can be adapted as appropriate to provide raw light field data to the illustrative vision system processes herein. See also by way of further background information U.S. Patent Application Publication No. 2012/0050562, entitled DIGITAL IMAGING SYSTEM, PLENOPTIC OPTICAL DEVICE AND IMAGE DATA PROCESSING METHOD, by Ulrich Perwass, et al., the teachings of which are incorporated herein by reference.

In general, the Lytra configuration uses fewer microlenses and combines the results of various combinations of pixels to generate various light field data, while the Raytrix design employs a larger number of microlenses to generate more light rays on the sensor assembly. While the exemplary camera assemblies employ physical microlenses (e.g. an array of convex lenses), it is contemplated that an alternate design for a "microlens" structure can include an array of small apertures (i.e. pinholes), in the manner of a pinhole camera, and the term "microlens" should be taken to include such an aperture array design.

Illustratively, the light field data is defined by a four-dimensional (4D) vector space that provides information on the position and the direction of all light rays in the image with respect to the object space. This information is sufficient to reconstruct the complete imaged scene at any working distance from the image plane. Notably, because the light field contains information related to a range of working distances, the object can be imaged at a full aperture ensuring maximum light reception from the imaged scene by the sensor array. By way of further background information related to light field rendering, reference is made to a detailed Internet Web publication at [http:]//graphics.stanford.edu/papers/light, entitle LIGHT FIELD RENDERING, by Marc Levoy and Pat Hanrahan, SIGGRAPH 1996.

II. Light Field Vision System Applications

A. Light Field Processing Overview and Operative Example

Figure 6:
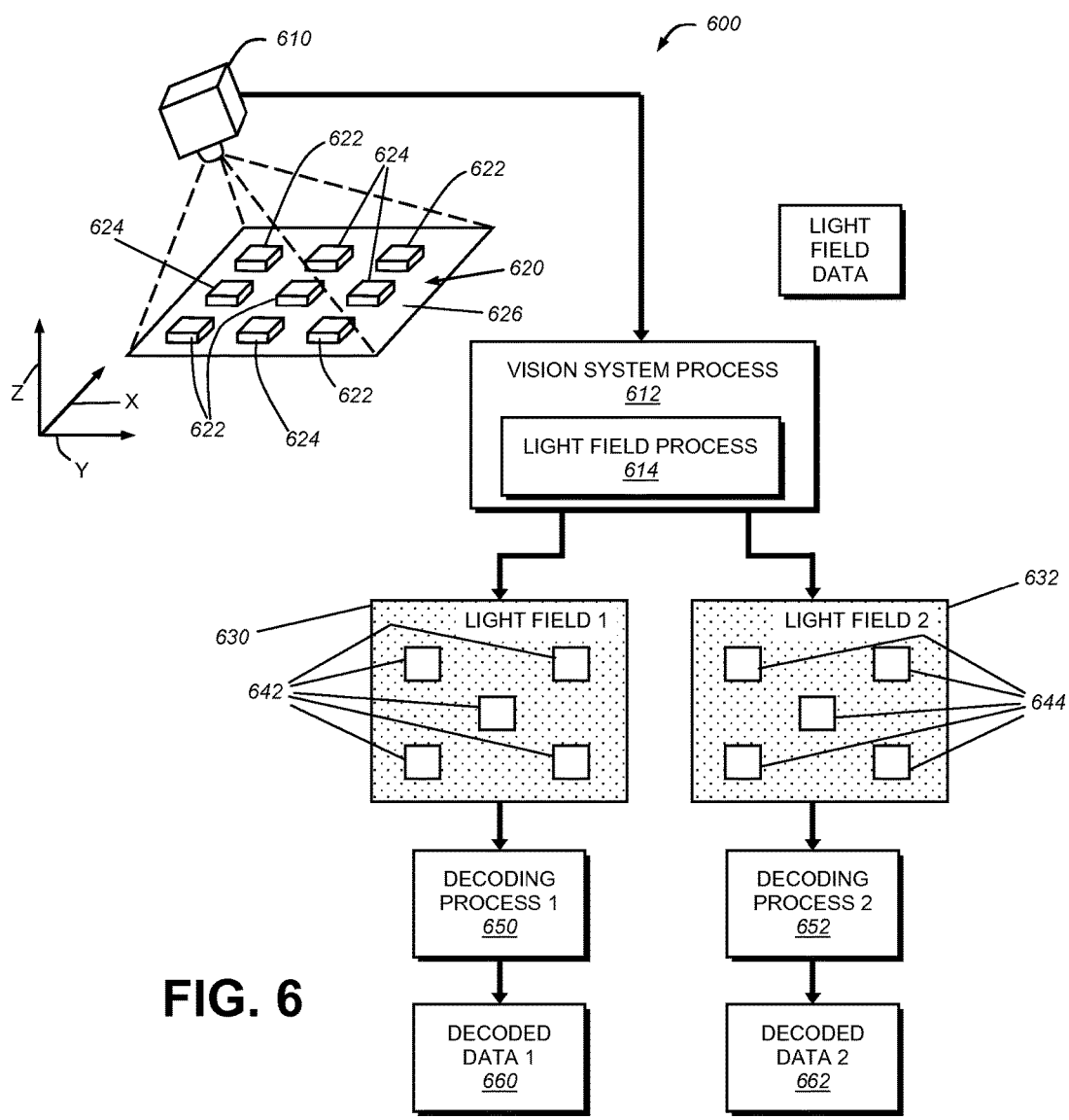
FIG. 6 is a diagram showing an exemplary vision system arrangement including a light field camera assembly, shown imaging an object and deriving results with respect to physical object features having differing elevations, according to an illustrative embodiment.

Having described the function and use of a light field camera in a vision system reference is made to FIG. 6, which shows an illustrative vision system application or process 600 using a light field camera 610 according to an illustrative embodiment, and an associated vision system process 612 that includes a light field analysis and manipulation process 614. In general, this process receives the raw or preprocessed light field data, and illustratively employs algorithms provided by the camera manufacturer and those described further below to resolve the received light field image data into a desired dataset with which follow-on vision system processes (also described further below) can be performed. That is, the light field data typically represents pixel intensity and/or color values at that are varied to provide differing focal distances and viewing perspectives based upon the focus of the overlying microlens. The manufacturer's algorithms are designed to resolve these pixel values into a single, in-focus image. The algorithms operate upon adjacent pixels as a group to derive a final pixel value at the same or (typically) lower resolution (e.g. a JPEG-type image having a 1080×1080 pixel resolution). However, such algorithms can also be employed to act upon certain perspectives and/or focal distances to allow parts of the image with certain of these characteristics to be selected/filtered in the image.

B. Selecting Image Features Based on Relative Height or 3D Shape/Size

With further reference to FIG. 6, the camera assembly 610 images an object 620 having physical features located at two different elevations along the depicted z axis with respect to an x-y plane 626. By way of example, the physical features can be a pair of "layered" 2D codes/IDs that each encodes a discrete set of information in relation to the object 620. One technique for producing such a layered code is to peen one code to a predetermined depth in the surface and etch or print another code on the surface. A code can also be molded onto the surface with two discrete raised or lowered (with respect to the surrounding surface) layers. The presence in the analyzed light field of pixel information at differing focal distances allows the light field process 614 to select/filter information based upon distance from the camera image plane. Thus, the process can create two sets of light field data 630 and 632. The first data set 632 contains image data which is filtered to provide only features 642, related to the higher-positioned object features 622. Likewise, the second data set 632 is filtered to provide only features 644 related to the lower-positioned object features 624. These two data sets 630, 632 are particularly provided by generating subsets of data from the light field in which image features (642, 644) at a two discrete focal distances are resolved (i.e. each layer is discretely focused by the software). In a basic embodiment, the process searches for portions of the image that are in focus and identifies these as regions of interest. The out-of focus portions are not of interest to the process and omitted from the resulting data subset. When the subsets of image features are generated, a vision system process, such as an ID-decoding process 650 and 652 decodes each subset using conventional or customized techniques. The decoded results 660 and 662 from each decoding process are then delivered for use by an appropriate data handling process (e.g. inventory tracking, package routing, etc.).

It should be clear that the process of FIG. 6 can be employed on a variety of imaged surfaces containing physical feature at varied elevation. A significant feature of a light field data set is that focus and other operations (described further below) that manipulate the data set are complete after an image is acquired and stored. Thus, data to generate different focus characteristics, points of view, etc. is available from a single image and can be used to generate a multiplicity of resulting images with a wide range of characteristics.

By way of further example, the decoding process 650, 652 can include an Optical Character Recognition (OCR) process that reads, for example, raised lettering and decodes the underlying textual and/or symbolic information therein (e.g. raised letters on a tire). Refocus steps that enable images at differing heights are further described below.

Figure 7:
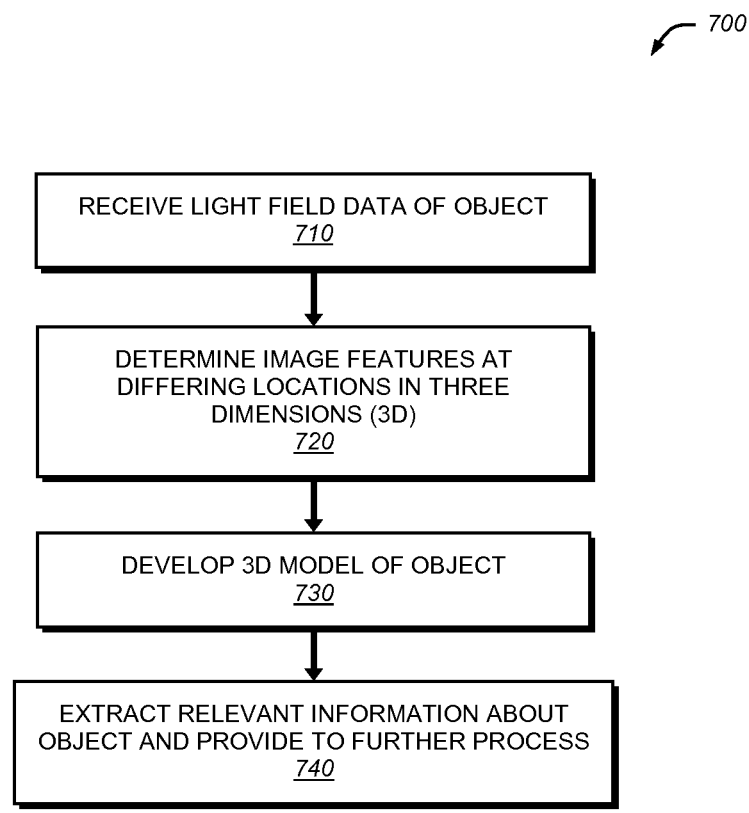
FIG. 7 is a flow diagram of a generalized procedure for employing light field image data acquired from an object to generate a 3D model of all or part of the object and perform further processes therewith, according to an illustrative embodiment.

More generally, the light field process (614) can be used to measure and analyze a three-dimensional object using the light field to determine relative distance from the image plane of various physical features in the object space. With reference to the flow diagram of FIG. 7, a basic procedure 700 for measuring three-dimensional size and/or shape of an object is shown. The procedure 700 begins in step 710 by receiving light field data of an imaged object from the camera assembly. The data is used by the light field process in step 720 to extract image features that are representative of the object in three dimensions. Since the relative distance of the object from the image plane can be determined for each feature via the 4D vector information, the image features can be associated with a position in a 3D object space. That is, procedure determines the best plane of focus for each pixel and this is associated with a 3D location. The 3D image data generated by the procedure 700 in step 720 can thus be used to derive a full-depth, or partial, 3D model of the imaged object in step 730. This model and/or other 3D information relevant to the object is then used in further processes. Such further processes can be provided by appropriate vision system tools and/or other procedures. For example, an inspection tool can perform 3D inspection of the modeled object; an alignment tool can be used to align the object in 3D; a robot manipulation process can drive a robot arm to manipulate the object or an associated component, or to perform other tasks in association with the object. Further 3D applications, such as measurement of electronic component connections, solder paste application, etc. can be assisted with such 3D modeling. Notably a logistics process can use a measurement of the object's (e.g. a package or box) size and/or shape (i.e. volumetrics) provided by the light field process to properly route it to a downstream location.

Figure 7A:
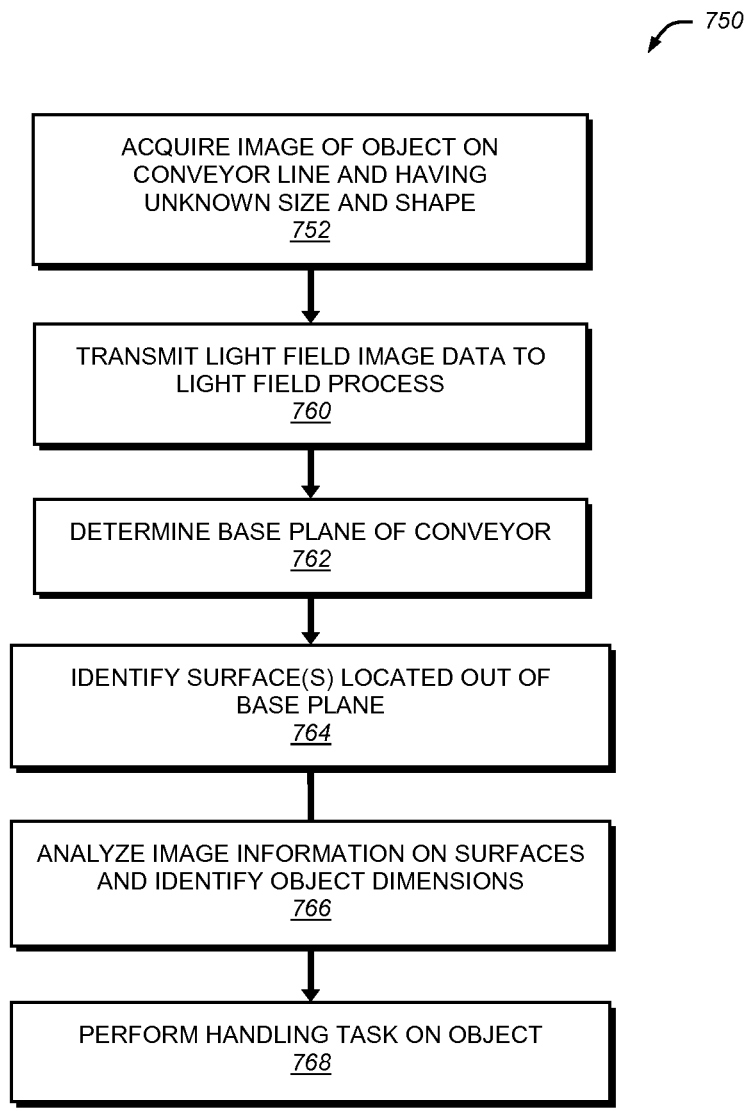
FIG. 7A is a flow diagram of a generalized procedure for employing light field data in the separation of an object from its surroundings in an exemplary logistics operation according to an illustrative embodiment.

More generally, and with further reference to FIG. 7A, a procedure 750 for determining the size and shape of an unknown object (such as a box) on a moving conveyor line is shown. Alternatively, as described above, the camera assembly can move and the object(s) can be stationary or both the camera and the objects can be in motion. Note also that objects and/or the camera assembly can be continuously moving during image acquisition or motion can be paused during acquisition (in this and any other embodiment herein). In step 752, the light field vision system camera acquires an image of the object and surrounding scene (i.e. a conveyor). The object typically defines an unknown shape and/or size. The light field image data is then transmitted to the light field process in step 760. The light filed process determines a base plane in the image—such as the plane of the conveyor in step 762. This base plane orientation and distance can be determined during the imaging of the object, or at an earlier time, and then stored as a relatively constant value. In step 764, the light field data is analyzed to determine one or more surfaces that are located out of the base plane—represented by light rays that define a different focus than that of the base plane. Such light rays are used to define the size and shape of an object on the conveyor in step 766. This object is thus separated from the surroundings and can be subjected to further tasks such as routing, sorting, handling and ID-reading in step 768.

C. Selective Focus of Object Image

Figure 8:
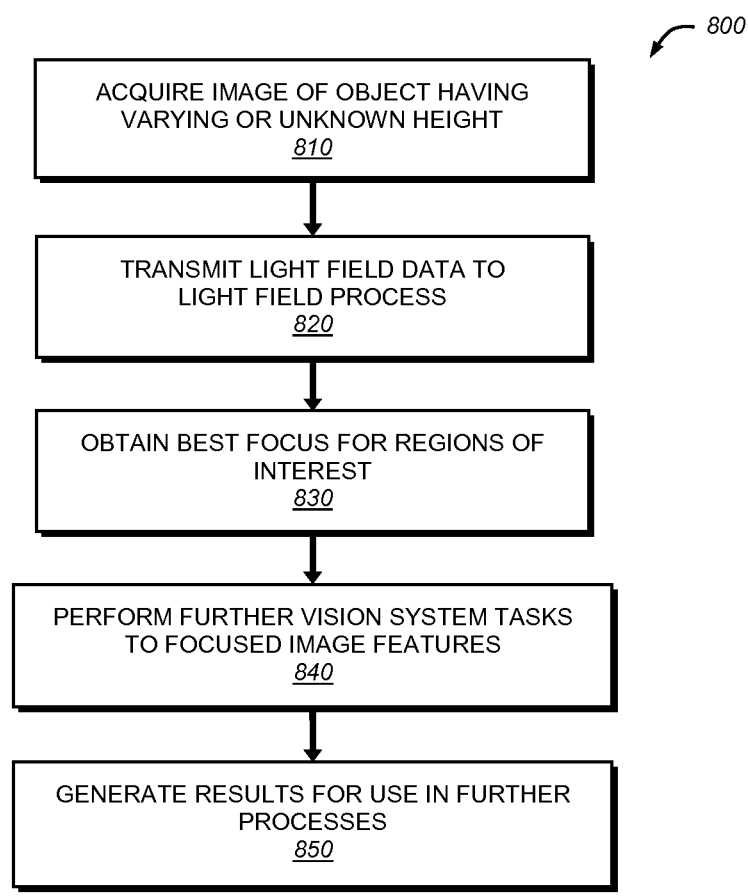
FIG. 8 is a flow diagram of a generalized procedure for employing light field image data acquired from an object with varying or unknown surface height to bring various surface features into best focus to perform further vision system tasks, according to an illustrative embodiment.

More generally and with reference to the procedure 800 of FIG. 8, the light field process (614) can be employed to achieve the best focus on various aspects of an acquired image of the object without explicit knowledge of that object's height/focal distance from the image plane of the camera. This can operate more particularly as an auto-focus mechanism for the vision system camera. By way of a non-limiting example, the system can compensate for the "planar tilt" in an object surface being imaged. In a conventional (pin-hole-model) camera such a tilt would generate an image that is focus along some portions thereover, but out-of-focus at other portions due to variation in distance from the image plane. The system can acquire an image of the object (step 810) with an "unfocused" light field. This light field data is then transmitted to the light field process (step 820). The process analyzes the data and obtains therefrom the best focus for (e.g.) the tilted region (of interest) of the object (and potentially the entire object). That is, the light field process can place every image pixel into best focus by an appropriate mechanism—for example, choosing the focal position that results in the crispest images. The process can then apply a predetermined constraint, for example that the imaged object surface of interest is a plane. Illustratively, this can be accomplished using a least-squares fit on the depth map) to optimize the focus. More generally, the light field process can bring a surface that is tilted in 3D with respect into focus by generating a 2D image in an arbitrary orientation. This 2D image can be used to derive perspective data that assists in performing a task.

Using this focused image data, the vision system process (612) and associated procedure 800 then proceeds (step 840) to perform a further vision task such as alignment, code-reading, inspection, or measurement, any of such tasks are potentially performed more effectively when the entire region of interest (and/or entire image) is in clear focus. The results obtained by the illustrative vision system process(es) can then be used in one or more further data handling and/or manufacturing process(es) (step 850), such as inventory tracking, logistics, robot manipulation, defect-elimination (e.g. part ejection), part identification, part registration, etc.

In the above example of a tilted (or otherwise varying-height) surface, vision system tasks can be applied more effectively using the information relative to the object surface's plane geometry. For example, the vision system task can generate a more accurate alignment model taking into account the expected perspective or can calibrate measurements based upon to increase accuracy.

It is contemplated that the various focus (auto-focus) processes/procedures implemented in conjunction with a light field camera can be constructed and arranged to optimize for achieving specific vision system tasks such as ID reading or alignment to a pre-defined accuracy. Some focus tasks can require a higher precision, while others can require faster response or a wider/narrower field of view.

Figure 9:
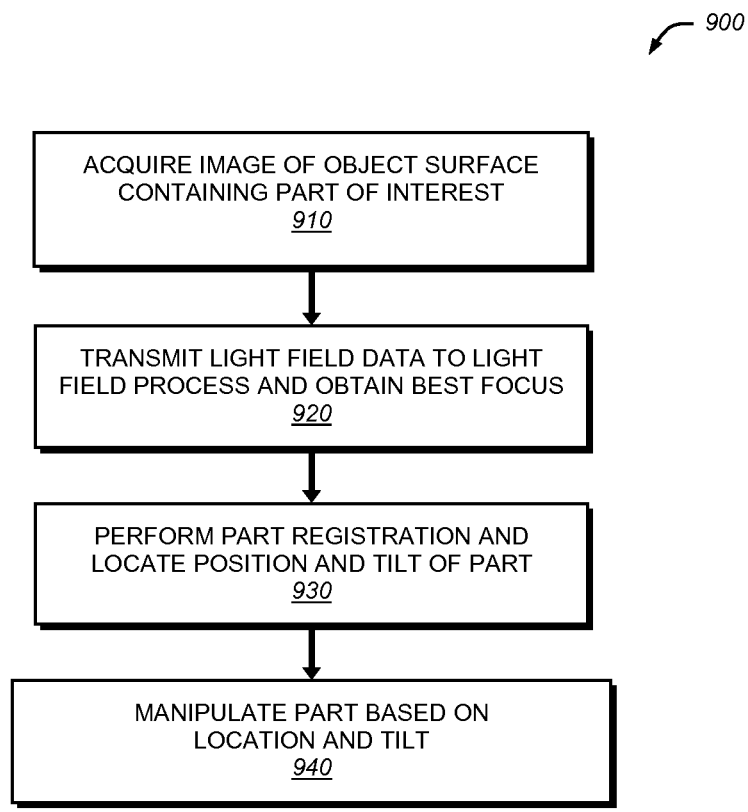
FIG. 9 is a flow diagram of a generalized procedure for employing light field image data acquired from an object with surface tilt to perform part manipulation in the presence thereof, according to an illustrative embodiment.

In another related embodiment, and with reference to FIG. 9 a procedure 900 is shown that employs a combination of part registration and determination of the position and tilt of a part to estimate the "pick" location/orientation for a generic pick and place application using a robot manipulator. More particularly, this procedure can be employed for a specific pick and place application, such as a die bonder (picking up dies to mount in lead frames) or a mounter (picking up integrated circuits (ICs), chips, or small electronic components to place on a printed circuit board). In step 910, an image of a scene containing the surface (e.g. a chip carrier tray or printed circuit board) and a part contained thereon (e.g. a circuit chip) is acquired by the light field-based vision system camera assembly. The light field data is transmitted to the light field process so that the best focus of the surface and part can be generated (step 920). Then in step 930, the procedure 900 employs a combination of vision system tools, including part registration relative to the surface, and finding of the position and tilt of that part for applications. With the results of those vision system tasks the part can be manipulated (e.g. picked and placed) in step 940, and providing an estimate of the tilt allows the position of the part to be determined for controlling the manipulator relative to the part and surrounding surfaces with significantly higher accuracy when the part is tilted (even when exhibiting a slight tilt).

Another illustrative use for a vision system that can selectively focus over an extended depth of field is for performing vision system tasks on a spherical, or spheroidal (or an N-hedron) shape where the ability to focus over a changing depth can be highly desirable. An example of such a task is reading or inspecting printing or IDs placed on a sports ball. A further example is the imaging of a box (e.g. in a logistics operation) to locate IDs and other surface features where the camera axis is oriented at approximately a 45-degree angle to vertical/horizontal planes of oncoming or outgoing boxes and the light field process allows both a side and top surface to be brought into focus concurrently to search for IDs, etc.

D. Filtering of Undesirable Optical/Light Effects

The use of a light field camera in conjunction with a vision system enables images that are processed by the vision system to be quickly and dynamically adapted to address lighting irregularities "in software". That is, the lighting of the scene my be irregular, having shadows, etc., but the manipulation of the light field image data allows the system to (e.g.) eliminate undesirable light and/or optical effects, such as reflections, non-uniformity, shadows, occlusion of features, etc. More particularly, these undesirable optical effects make it generally challenging when attempting to perform machine vision operations on specular and/or highly reflective surfaces, such as polished metal, silicon wafers, etc.

Figure 10:
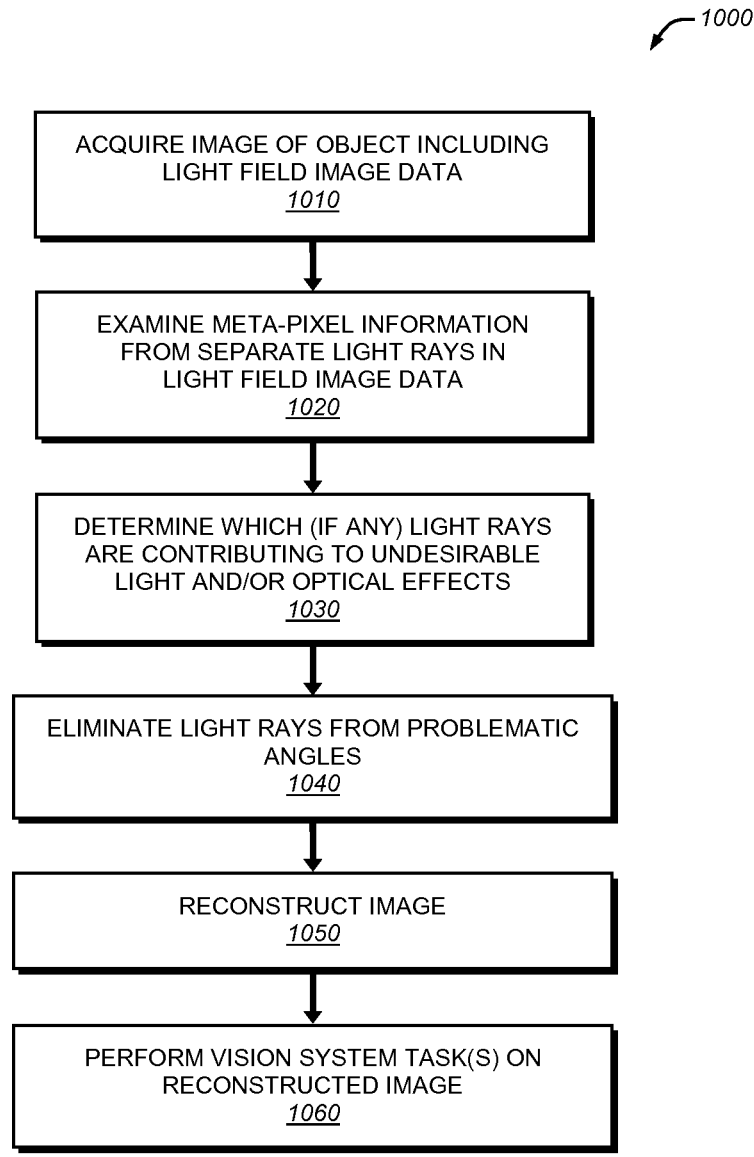
FIG. 10 is a flow diagram of a generalized procedure for filtering light field image data acquired from an object to eliminate undesirable optical effects, such as specular reflection, and provide a clearer image for use in vision system tasks, according to an illustrative embodiment.

With reference to FIG. 10 a generalized filtering procedure 1000 is shown. In step 1010 the system acquires a light field image of an object and the light field image data is transmitted to the system's light field process. Notably, a light field by its nature includes separable information on light rays coming from a variety of angles. Some of these angles are responsible for undesirable optical effects (e.g. due to direct reflection from a lighting source). In step 1020, the procedure 1000 examines the meta-pixel information of the light field image data from separate light rays. This information is used to determine if there exist undesirable effects in the image using appropriate techniques (step 1030). Such techniques can include searching for bright spots and/or similar discontinuities in the image field. Since effects typically reside in rays of certain angles, such angles can be flagged by the procedure. In step 1040, the procedure 1000 then eliminates (filters-out) any light rays residing along angles (problematic angles) that have been identified as containing undesirable optical effects. Having filtered out the problematic light rays, the procedure then reconstructs the image free of the contributions of such problematic angle data in step 1050, thereby providing a clear image. The vision system then performs any desired vision system task on all or a portion of the filtered image in step 1060.

E. Refocus of Image

Figure 11:
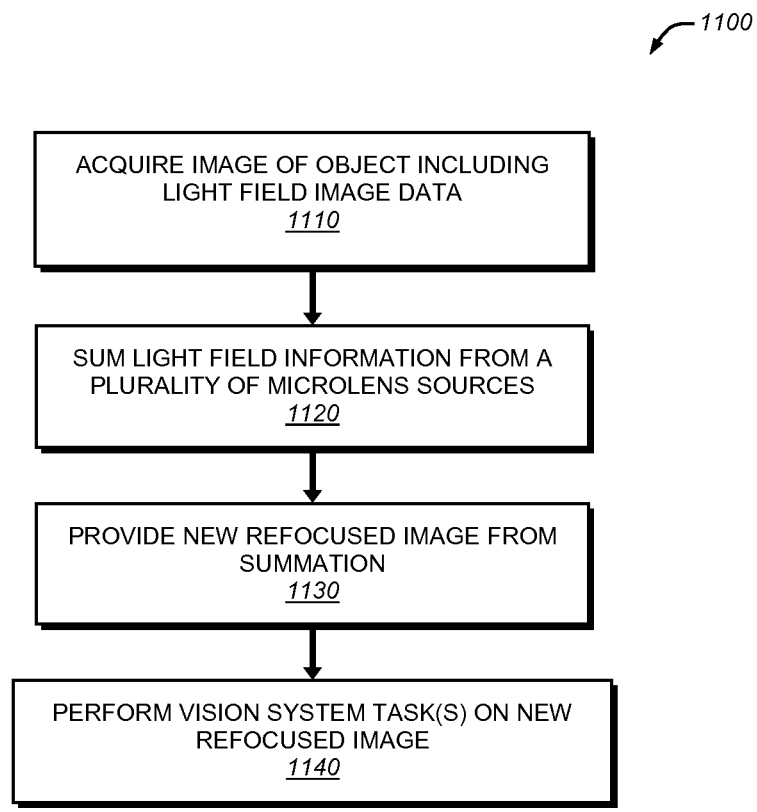
FIG. 11 is a flow diagram of a generalized procedure for refocusing light field image data acquired from an object for use in vision system tasks, according to an illustrative embodiment.

As in the case of focus, the system can be adapted to refocus the image to achieve a desired effect for use in a vision system process. With reference to FIG. 11, a refocus procedure 1100 is shown. The procedure 1100 begins in step 1110 with the acquisition of an image of an object containing a light field. The image contains features requiring refocus to perform, a desired vision system task (for example a layer or a layered ID/code). In step 1120, selected information from some or all of the pixels associated with each of a plurality of microlenses is summed together. This summation is used to form a refocused image in step 1130. The refocused image is then used to perform any appropriate vision system task (e.g. ID finding and decoding) in step 1140.

F. Digital Stopping to Control Aperture

Figure 12:
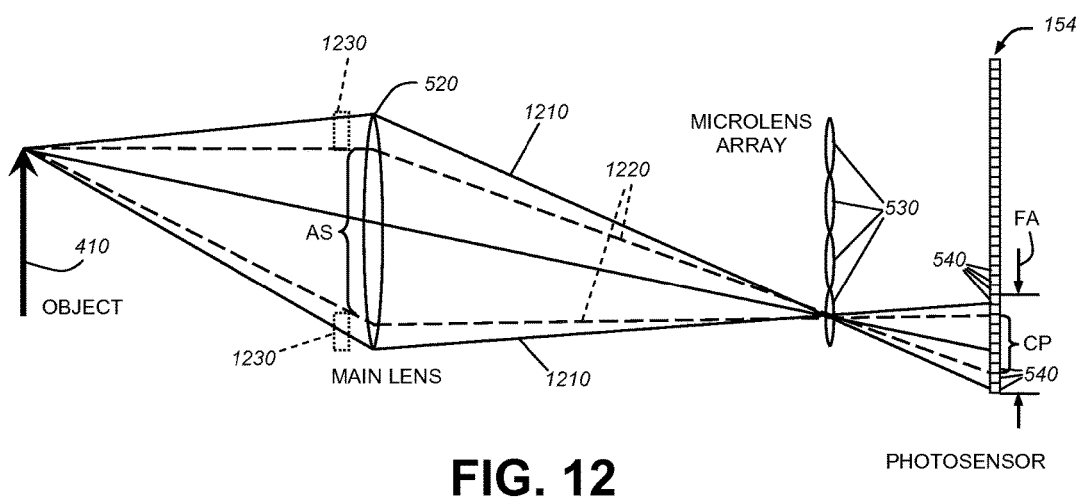
FIG. 12 is a diagram showing acquisition of a light field image using a microlens array and associated image sensor in accordance with the arrangement of FIG. 5, further depicting the digital aperture stop effect when extracting information from a constrained group of pixels associated with each microlens.
Figure 13:
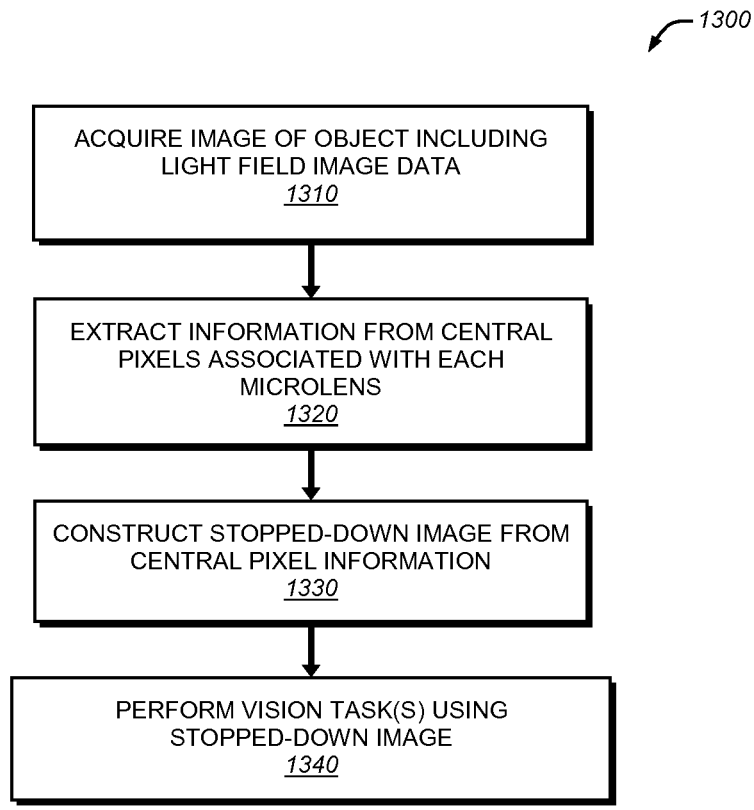
FIG. 13 is a flow diagram of a generalized procedure for stopping down a light field image of an object for use in vision system tasks, according to an illustrative embodiment.

Reference is made to the diagram of FIG. 12 that again shows a generalized light field camera arrangement similar to that of FIG. 5, where like reference numbers refer to like elements in each diagram. The full aperture light field image projected through each microlens 530 to the associated pixel array (i.e. a 15×15 array) of the overall sensor is depicted by the rays 1210. This pixel area FA represents this full aperture field. However, by extracting pixel data only from a more constrained area associated with each microlens—typically a group of central pixels CP, the image is effectively reduced to a stopped-down aperture as denoted by the dashed ray lines 1220. The process, thus, generates a virtual aperture stop (dashed blocks 1230) with a reduced aperture AS. Referring briefly to the flow diagram of FIG. 13, the procedure 1300 an image of an object is acquired in step 1310, containing light field image data. This data includes pixel data fro each associated microlens. In step 1320, information only from central pixels (or some other "constrained" region of the microlens' associated (e.g.) 15×15 array) is extracted and stored as part of the image data to be handled by the light field process and corresponding procedure 1300. The procedure 1300 then constructs an image using only the central/constrained pixel information in step 1330. In step 1340, the stopped-down image resulting from this construction step (1330) is used in the performance of one or more desired vision system tasks. For example, this technique is useful for use in tasks where the depth of field/focus is desirably altered, as a result of the stopping-down of the aperture. The stopping down of aperture is also potentially useful in exposure control or brightness control applications, and these can be accomplished in "software" after the image is acquired and free of any physical changes to the camera optics—as in the case of conventional aperture adjustment. The stopping down of the image can also assist in focusing processing attention on a smaller area of an overall image—for example an area in the scene expected to contain an ID. This can speed certain processing steps.

It should be clear that various light-field-image-processing tasks, such as stopping-down, filtering, and the like, can be preformed on all or a portion of the overall light field image. For example, such processes can be performed on one or more regions of the image that are known or determined to contain features of interest.

G. Altering Point of View

Figure 14:
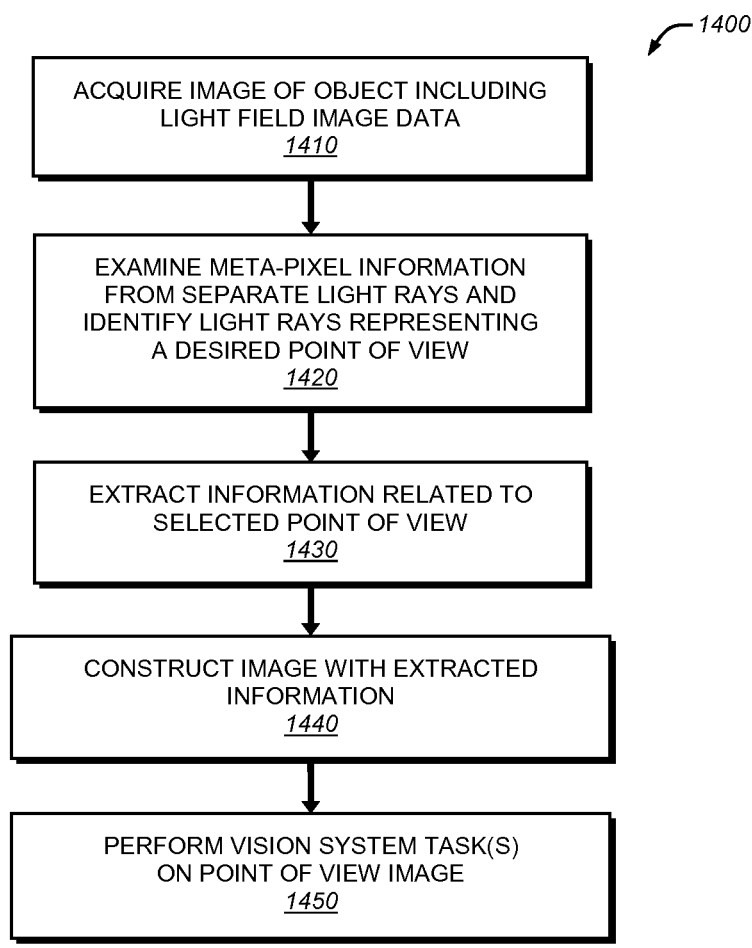
FIG. 14 is a flow diagram of a generalized procedure for a point of view of a light field image of an object for use in vision system tasks, according to an illustrative embodiment.

It is often desirable to perform vision system tasks from a differing point of view on an object when a given point of view is slightly occluded and/or shadowed, or a clearer image can be obtained in one point of view than another. The light field contains image data relative to a (limited) range of view points/viewing angles. With reference to the procedure 1400 of FIG. 14, an image of an object is acquired containing this light field in step 1410. The light field contains data representing light rays reflected from the imaged object that enter the camera at a range of angles (within at least a few degrees). The procedure 1400 examines the meta-pixel information to identify rays relative to a certain desired point of view/viewing angle on at least a portion of the overall light field image (step 1420). For example, a certain feature on the object can be better imaged at a slightly different angle, so the pixel data that represents at least this feature is identified and light rays representing the best point of view are selected. Alternatively, all light rays in the image representing the desired point of view can be selected. In step 1430 the procedure 1400 extracts all information from the light field data relative to that point of view (and any other data needed to construct the complete image). The image is then constructed in step 1440, and appropriate vision system task(s) are performed using that image data—for example ID/code-reading, alignment, inspection, etc. in step 1450.

It is expressly contemplated that in this, and other processes and procedures described herein, that a plurality of successive images can be acquired and different adjustments and/or modifications can be made to each image to assist the vision system task(s). For example, two successive images can be acquired at different points of view and the features of interest in each image can be operated upon by the vision system. A particular example would involve an image of a box where one point of view better images the top and another point of view better images the side. Appropriate information on the top is read in that first image and other appropriate information is read from the side in the second image.

Likewise the procedure for selecting a predetermined point of view, above, can be employed to remove undesired light and/or optical effects, such as specular reflections. In general, such reflections exist within a relatively narrow angular range. If reflections or other undesired optical effects are detected, then the procedure can change the point of view to provide image data representing a differing angle for the point of view, which is substantially or fully free of such effects.

A slight variation on the procedure 1400 entails extracting information from a series of rays that render an object forward in the field of view or rearward in the field of view. This can be achieved by selecting rays based upon the location of their crossing point along the optical axis. Notably, this procedure allows for depth information to be derived, as the light field process generates, in essence, two or more stereoscopic images that can be used to generate depth information in various features. This can be achieved using conventional triangulation computations in the manner of a stereoscopic camera, in which two images are concurrently acquired from optics that are separated by an appropriate baseline. That baseline is relatively short, essentially defined by the width of the focus lens.

Figure 14A:
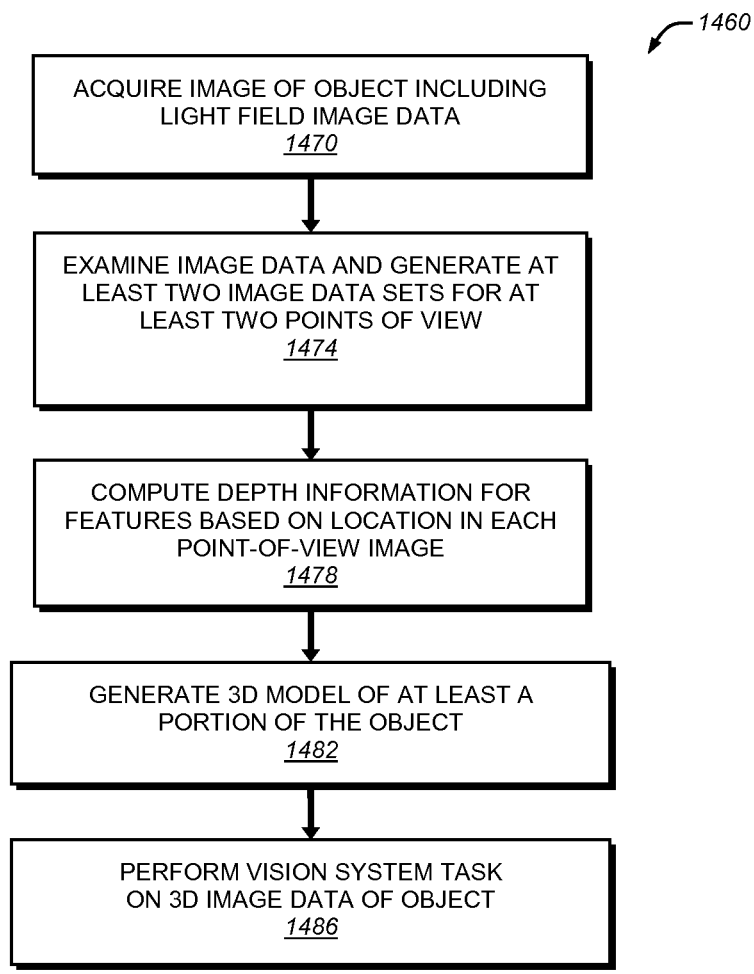
FIG. 14A is a flow diagram of a generalized procedure for using the light field image data to generate two or more discrete point-of-view images that are used to define a 3D model of at least a portion of an imaged object, according to an illustrative embodiment.

FIG. 14A provides a procedure 1460 that allows for the determination of 3D depth information. In step 1470, the camera acquired a light field image of an object. This light field image data is then analyzed in step 1474 (for example in accordance with step 1420 above) to generate multiple image data sets at discrete, differing points of view. These point-of-view images allow for the computation of depth information as described above (step 1478). Matching features in each image are identified and a triangulation can be performed. Based upon this depth information, step 1482 generates a 3D model of at least a portion of the imaged object. This 3D model data can be used in performing appropriate vision system tasks, such as robot manipulation in a 3D volume space.

H. Range-Finding and Autofocus

Figure 15:
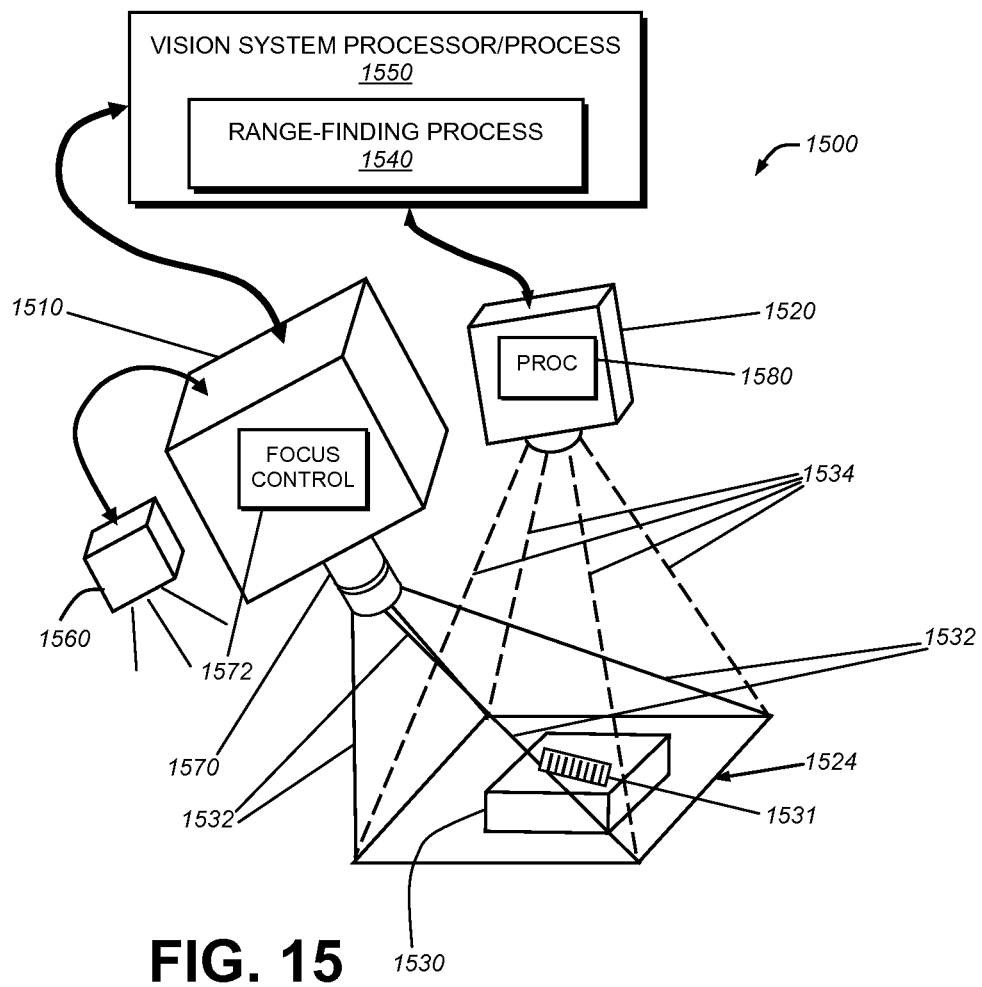
FIG. 15 is a diagram of a vision system arrangement of both a conventional high-resolution vision system camera and a light field camera that acts as an intelligent "range finder" in the operation of the vision system camera according an illustrative embodiment.

Current light field camera technology typically lacks the higher definition available in conventional camera arrangements (e.g. shown in FIG. 4). For certain applications it is desirable to capture one or more images employed in the vision system task(s) at a higher resolution than available with a light field arrangement. Thus, the illustrative arrangement 1500 of FIG. 15 includes both a conventional vision system camera 1510 and a light field camera 1520 in accordance with an embodiment herein. The two cameras can be housed together with separate optics, sensors and processors, or in separate housings as shown. In further embodiments, the two camera systems can share some or all of their optics, using appropriate prisms, beam splitters, and the like (in accordance with skill in the art) to project light from the scene on two separate sensor arrangements (i.e. one with microlenses for the light field camera and one that is a conventional array). Thus, for the purposes of this description, the terms "light field camera" and "conventional vision system camera" can include arrangements where there are two (or more) discrete camera assemblies or where some or all of each "camera" is combined in a single assembly. One or more processors, operatively connected with each sensor (or both sensors) can be used to carry out image field processes (shown by block 1540) and vision system processes (shown by block 1550). Both cameras 1510 and 1520 can image approximately the same field of view 1524, which contains object 1530 having one or more features of interest 1531. The conventional camera's field of view is represented by solid-line rays 1532 and the light field camera's field of view is represented by dashed-line rays 1534. One or more internal and/or external illuminator(s) 1560 provide illumination to the scene and can be strobed by the conventional vision system camera 1510 and/or the light field camera 1520 upon acquisition of an image. As described below, the vision system camera 1510 can contain auto-focus and zoom capabilities that vary its field of view. These capabilities can be based on conventional or customized electro-mechanical and/or liquid lens technology in various embodiments that are provided (at least in part) to the lens 1570 and driven by a focus control process 1572 that is part of the camera's vision system process/processor 1550.

Figure 16:
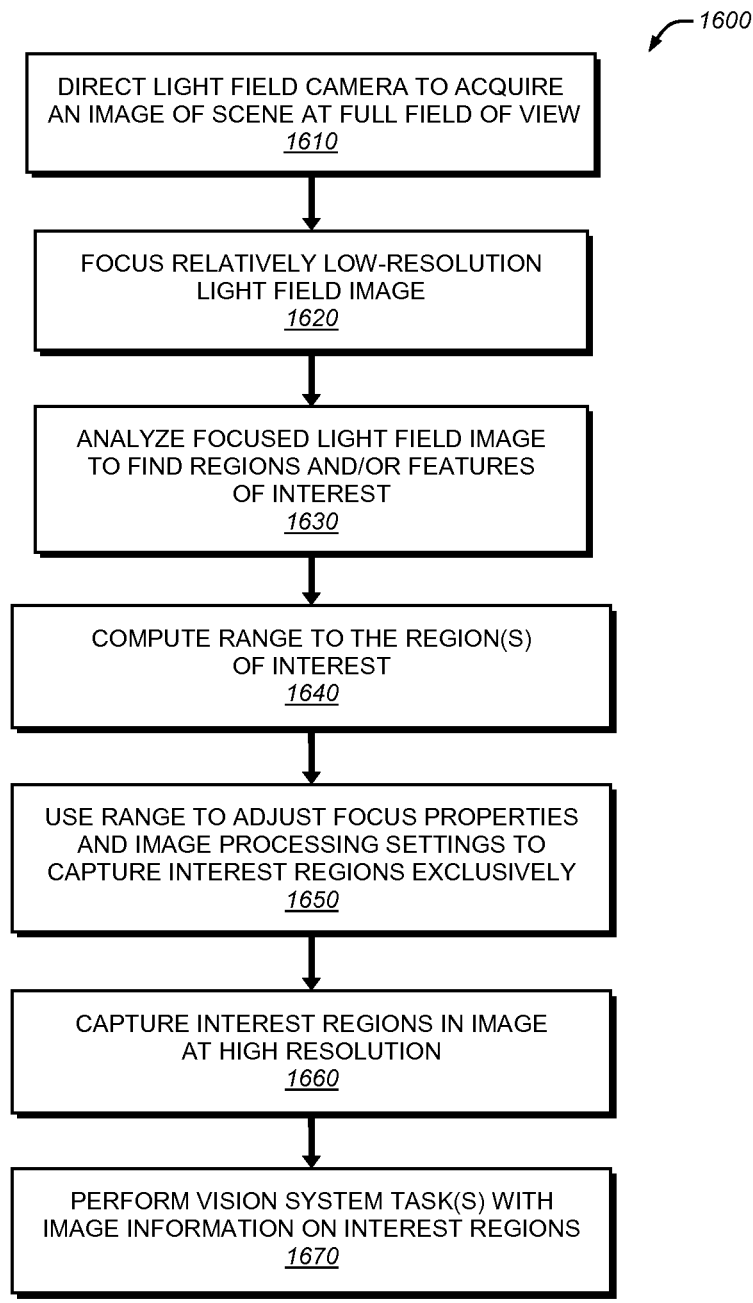
FIG. 16 is a flow diagram of a generalized procedure for acquiring images and processing acquired image data according to the range-finding arrangement of FIG. 15.

With further reference to FIG. 16, a procedure 1600 for operating the arrangement 1500 is shown. Notably, the light field camera 1520 is employed, in essence, as an intelligent "range-finder" for focusing, and directing image acquisition/processing by, the higher-resolution conventional vision system camera 1510. The procedure 1600 begins when an image acquisition is triggered, at which time the light field camera 1520 is directed to acquire a relatively low-resolution image of the scene at full field of view (FOV) in step 1610. The light field camera's native processor/process 1580 (or another external processor operating on raw light field data) focuses the relatively low-resolution image in step 1620 to reveal any features and/or regions of interest in the image and associated object. Such interesting regions or features can be those with barcodes, edges, holes, certain patterns, or other desired features. The image is analyzed in step 1630 to determine if and where in the image such features occur. Then in step 1640, the range-finding process 1540 in FIG. 15 computes the range to these interest regions by back-computing it from the light field data. That is, the focus operation in the light field process uses selected data to bring certain parts of the image into focus. That data allows computation of a range. This range data is then used by the range-finding process 1540 to adjust the focus settings on the conventional vision system camera through its internal focus process 1572 that can operate on the lens as well as the camera's internal settings (step 1650). The settings that are controlled by the range-finding process can include focusing the camera's attention on certain portions of the overall image that contain desired regions of interest and transmitting that part of the image exclusively to vision system processes. This can include reducing the FOV of the vision system camera—for example to focus on the object or a discrete area of the object. In step 1660 the conventional vision system camera 1510 captures the image using the adjusted settings at higher resolution than the light field image. This image includes regions of interest and can omit areas of the normal FOV that are not of interest. In step 1670, one or more vision system tasks are performed by the vision system processor/process 1550 on the regions of interest. Because unneeded image data is omitted, vision system processes can occur more efficiently.

Uniquely, it is recognized that conventional techniques for auto-focus of a camera do not employ range information as an input to the auto-focus process. Thus, it is contemplated herein that range information be input as part of the metric for what would be interesting in the scene. For example, it is contemplated that features closest or furthest from the camera can be the most interesting items in the scene. Alternatively, it can be contemplated that items which are locally closest or furthest from the camera are the most interesting ones in the scene. The range data can be used to make such determinations and adjust the vision system camera accordingly.

I. Further Specific Applications and Embodiments

Figure 17:
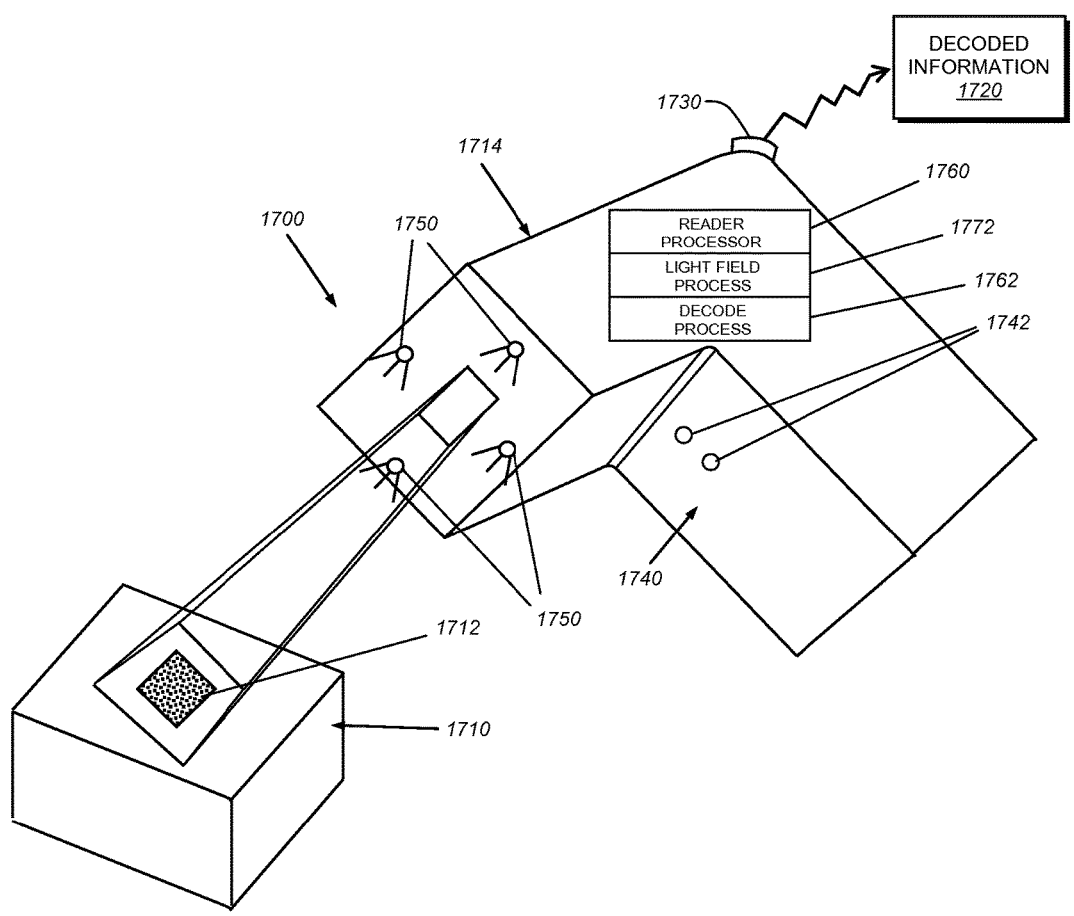
FIG. 17 is a diagram of a handheld ID/code reader employing a light field camera assembly to acquire images of objects containing IDs according to an illustrative embodiment.

Reference is made to FIG. 17, which shows a generalized ID/code reader system 1700 acquiring an image of an object 1710 containing an ID (e.g. a 2D or 3D barcode, characters, symbols, etc.) 1712. The depicted reader 1700 includes a housing 1714 that is a conventionally shaped and sized handheld unit that delivers decoded information 1720 to a downstream data handling process, such as a logistics or inventory tracking system. Appropriate wired and/or wireless connections can be employed to transmit data. The reader 1700 can include various user interface devices, such as lights, alarm speakers, and the like, on one or more external panel(s) 1730 that indicate successful and unsuccessful code-reads, among other functions. The reader can also include a grip assembly 1742 containing one or more trigger button(s) 1742 that the user selectively presses to control illumination (via exemplary internal illuminators 1750) and acquisition of images. Other standard and custom features can be provided to the reader system 1700 according to skill in the art.

The reader 1700 includes, within its housing, a reader processor that caries out various system control and data handling functions, including vision system processes, such as ID-finding within an acquired image. The ID(s) can be decoded in whole or in part by a decoding process 1762 that operates on the reader processor and/or on a separate processor, such as a decoding DSP. Notably, the reader 1700 houses a light field camera assembly 1770, which is implemented as described generally above and contains, appropriate front-end optics, a microlens assembly and underlying sensor with pixel array. The light field camera assembly 1770 transmits light field image data to the light field process 1772, which can operate on the reader processor 1760 and/or a separate light field processor. Based upon programmed instructions, the light field data is delivered to other vision system processes (e.g. ID finding), and thereafter to the decoding process if ID candidates are located in the image data. As described above, programmed instructions can enable the reader to search for layered IDs as described above, and more generally produce clear, readable images of any IDs in the field of view.

It is expressly contemplated that the system 1700 can be modified to be implemented in a fixed-mount reader with appropriate optics, internal and/or external illuminations (e.g. bar illuminators), field-of-view expanders, etc. and that multiple, side-by-side readers in this implementation can be employed.

It is also contemplated that tasks such as decoding could be performed without achieving perfect focus with the image data. Illustratively, the image can be processed for focus by the light field process until decoding process confirms that the checksums in the extracted code data are valid. A decoded result is then output by the reader.

Figure 18:
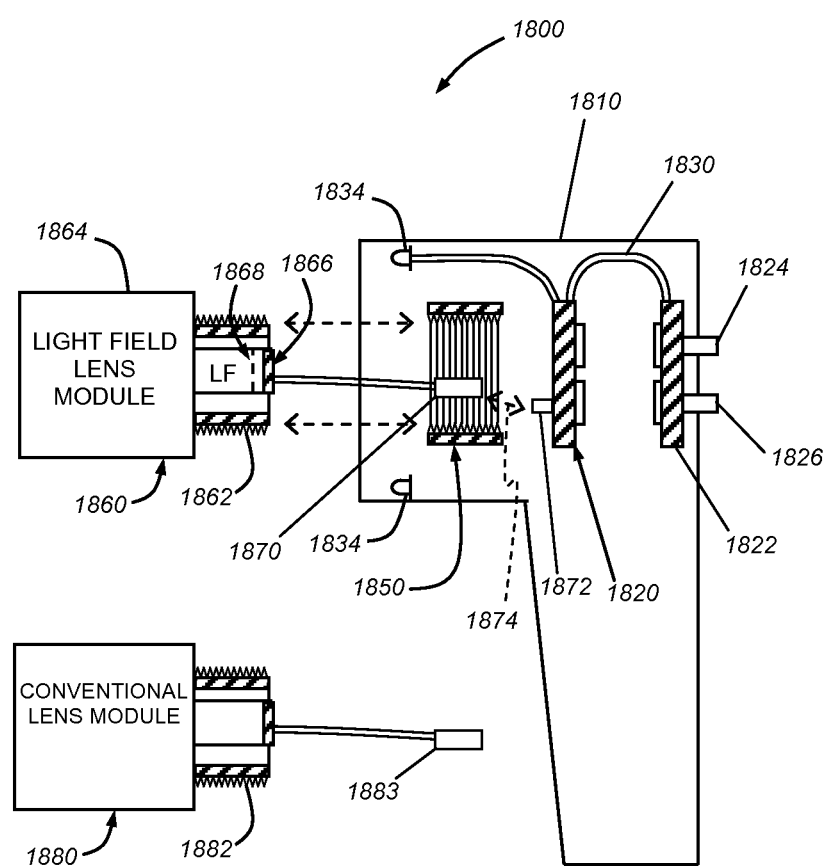
FIG. 18 is a schematic cross section of a vision system camera employing swappable lens modules, including a light-field-based lens module and a conventional-camera-based lens module, according to an illustrative embodiment.

Reference is made to FIG. 18, which shows a simplified cross section of an exemplary camera assembly 1800 for use in any appropriate vision system task. The camera includes a housing 1810 of any acceptable shape and size. By way of example, the housing 1810 supports a main processor circuit board 1820 and one or more secondary circuit boards (e.g. an interface board 1822 with external connectors 1824, 1826 for programming, external illumination networking, etc.) connected by appropriate cables, etc. 1830. The front face 1832 of the housing 1810 includes an optional internal ring illuminator 1834 with a plurality of light sources (e.g. LEDs). It should be clear to those of skill in art that the depicted arrangement of components is highly variable in alternate embodiments of the camera assembly. The housing assembly includes a mount base according to a conventional design (e.g. a threaded C-mount), or a custom design. Illustratively, a lens module 1860 is provided, which includes a corresponding mount 1862. As described above, the lens module 1860 can include fixed of adjustable optics in its barrel 1864—such as a variable-focus liquid lens assembly. Notably, the sensor 1866 is attached to the module 1860 and arranged as a light-field sensor with a microlens array 1868. One or more removable electrical connectors 1870 allow the lens to be controlled and transmit image data from the sensor 1866 to the processor board 1820 via one or more mating board connector(s) 1872 (see dashed arrow 1874). Alternatively, one or more of the camera's connector(s) with the lens module 1860 can be located on the external surface (e.g. the front face 1832) of the housing 1800. The on-board circuitry of the lens module 1868 can include various light-field-specific processors/processes, or such processors/process can be provided within the circuitry of the camera (e.g. processor board 1820). The camera's processor is constructed and arranged to recognize an interconnection with a light field camera module, and carry out processes appropriate to light field image data as described generally herein. Other lens modules, such as a conventional lens and sensor assembly 1880 can be provided so that the user can swap between camera types. A mount 1882 allows the lens module 1880 to be removably attached to the mount base 1850, and an appropriate connector 1883 removably mates to the housing connector 1872. When connected, the processor recognizes that a conventional sensor arrangement is attached and automatically provides processes relevant to a conventional sensor arrangement. Detection of what type of lens, as well as other parameters (e.g. optics, focal distance, etc.), can be included in information that is part of an initial "handshake" between the lens module and the camera processor upon startup or another event. It should be noted that the type of camera/housing employed in conjunction with the illustrative, swappable lens module is highly variable and can define either a fixed mount or handheld unit as appropriate.

Figure 19:
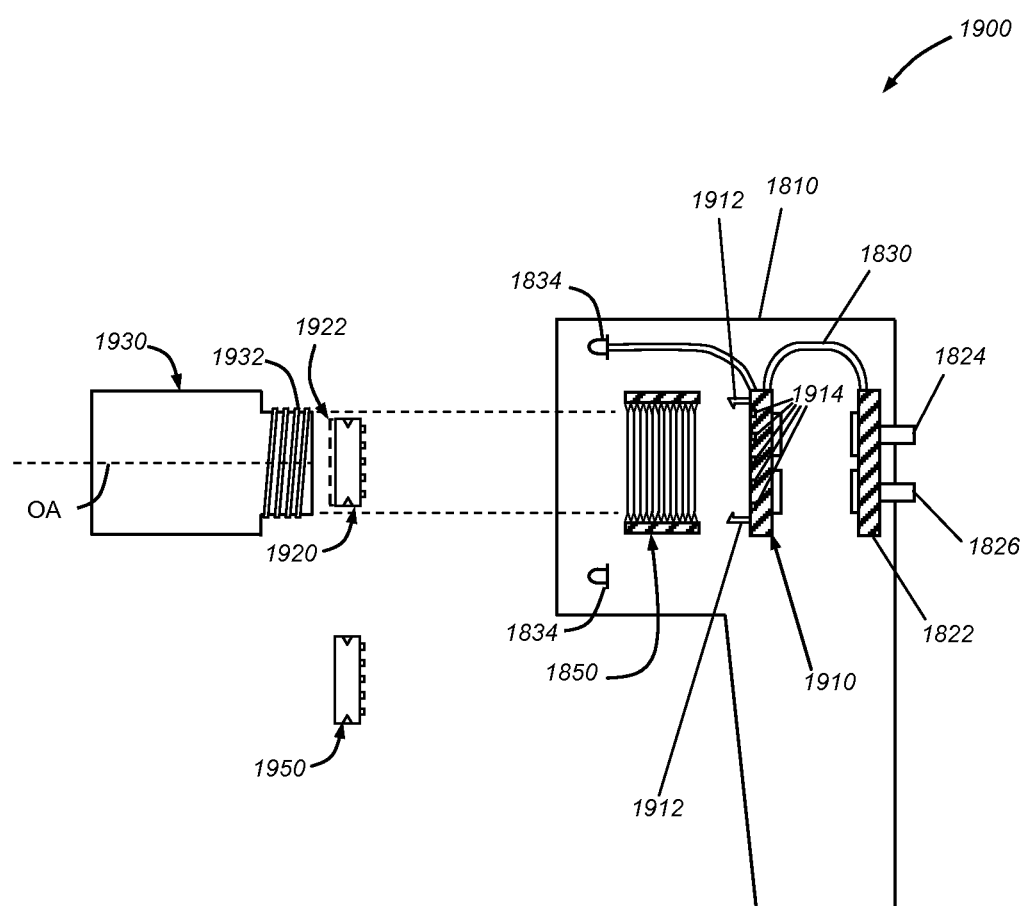
FIG. 19 is a is a schematic cross section of a vision system camera employing swappable sensor modules, including a light-field-based sensor module and a conventional-camera-based sensor module according to an illustrative embodiment.

A camera assembly 1900 that is a variation of the above-described swappable lens module arrangement of FIG. 18 is shown in FIG. 19. Similar components in each embodiment are provided with like reference numerals. The housing 1810 includes a processor/circuit board 1910 having mounting structures (e.g. prongs) and connection pads 1914 that removably receive and interconnect a light field sensor module 1920 with an associated microlens assembly 1922. It should be clear to those of skill that the mechanism and technique by which the sensor module 1920 is removably attached and interconnected is highly variable in further embodiments. A conventional or custom lens 1930 is removably attached to the mount base 1850 by a threaded mount 1932 (e.g. a C-mount). The lens can, alternatively be fixed to the housing and the light field sensor module 1920 is attached to and removed from the housing by another pathway, such as a side panel or the rear (i.e. by removing the circuit board 1910). When mounted, the light field sensor module 1920 presents an image plane substantially perpendicular to the optical axis OA, and at a correct focal distance with respect to the lens 1930. The lens 1930 can be adjustable or include variable focus/zoom as described above. Notably, the light field sensor (and microlens) module can be swapped for another module, such as a conventional pixel array (free of any microlens structure) 1950. The same (1930) or another appropriate lens/optics package can be mated to the conventional sensor module 1950. The conventional sensor module attaches and interconnects to the board 1910 in the same manner as the light field sensor module 1920. The camera processor recognizes the type of sensor in a manner described generally above and carries out light field processes and/or vision system processes that are appropriate to the sensor type.

Another specific application of light field camera technology to a vision system is in the area of laser profiling. In general laser profile entails projecting a fan of laser light of a surface having height variation. The height variation is represented as a series of discontinuities in the line presented to the image. A non-perpendicular angle is defined between the laser axis, lens axis and sensor's image plane. The components of the profiler are arranged to fulfill the so-called Scheimpflug principle so as to define a sharp image of the laser line at every measurement distance. This requires a relatively constrained optical system. By way of background, the operation of an exemplary profiler arrangement is shown and described in applicant's commonly assigned U.S. patent application Ser. No. 13/468,704, entitled LASER PROFILING ATTACHMENT FOR A VISION SYSTEM CAMERA, by Laurens Nunnink, the teachings of which are incorporated herein by reference.

Figure 20:
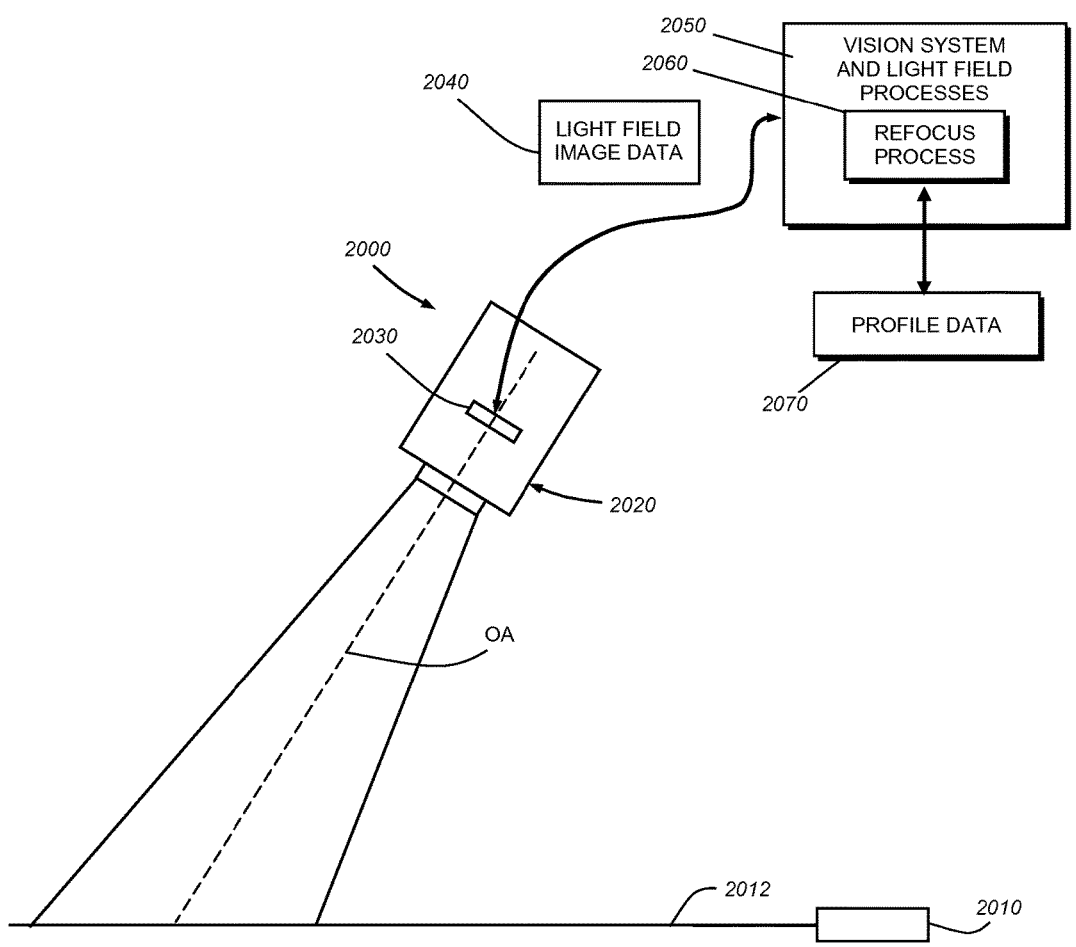
FIG. 20 is a schematic diagram of a laser profiler arrangement using a light field camera sensor assembly to refocus the laser line image in a manner free of specialized optical arrangements, and with the image plane of the sensor assembly generally perpendicular to the optical axis.

A less-optically-constrained profiler arrangement 2000 that those using conventional sensors is shown in FIG. 20. The arrangement includes a fan-projecting laser assembly 2010 of conventional design. The camera 2020 having an optical axis OA images the scene containing the laser line 2012. The image is directly projected to a light field image sensor assembly 2030 as described herein. The sensor's image plane is located perpendicular to the optical axis OA allowing for significantly more flexibility in the overall camera set-up (e.g. the ability to use a variety of conventional lenses). The light field image data 2040 is transmitted to an internal and/or external vision system process and light field process 2050 as described herein (and operating on one or more processors). The light field process includes a refocus process 2060 as described above, that analyzes the light field and generates the best focus for the laser line image. This is used by vision system processes (e.g. a profiler process) to generate desired profile data 2070.

A further advantage of the use of a light field sensor assembly in an arrangement using structured lighting (i.e. a laser) to generate a 3D profile is that the ability to change point of view as described above enables the system to read certain areas that can be otherwise occluded at a certain, fixed point of view. This allows for more of the image to be processed using a single camera assembly. More generally, structured light can be provided, for example, in the form of a laser line/fan as used in a profiler, or in the form of a dot or other defined shape as used, for example, in an aimer. In the case of an aimer, the system can determine relative distance based upon the imaged location of an aiming dot as it is brought into focus by the light field process.

It is contemplated that a variety of processor types and arrangement can be used in conjunction with a light-field-based vision system according to illustrative embodiments. Because light field technology employs a software-based "decoding" step, such a processing arrangement can employ a processing architecture that is adapted to efficiently accommodate this task. For example, a SIMD-based Vision System on a Chip (VSoC) such as described in commonly assigned Published U.S. Patent Application No. 2009-0072120, entitled CIRCUITS AND METHODS ALLOWING FOR PIXEL ARRAY EXPOSURE PATTERN CONTROL. Alternatively, a multi-core DSP, or a dedicated FPGA can be employed to perform light field processes. Each of these architectures facilitates real-time or near-real-time decoding at a given focal depth. Thus a vision system that includes such a processing architecture for ID-reading, or other vision system tasks can advantageously increase the overall speed of the light field process and render it practical for a wide range of such applications. Efficiency and speed can also be enhanced by employing a grayscale sensor with higher resolution than the typical color sensor that is available in commercial light field camera implementations. Such a grayscale sensor can be employed in conjunction with a microlens structure contemplated herein. Optics and/or a microlens structure that enable a greater refocus range (for example 5 to 15 centimeters for ID-reading) can enhance performance of the light field camera in various vision system applications as described herein.

It is also contemplated that the processing of a light field image in the context of a vision system can employ various mathematical techniques that desirably enhance efficiency and processing throughput. Illustratively, a mathematical process/algorithm used in the vision system can describe the light field so that each spatial pixel is represented by an array of numbers. This array can be used to construct a transformed "image space". Those of skill can recognize that such an image space can be manipulated in a manner similar to frequency transforms. According to embodiments, the light field process can employ decoding or analysis routines that operate in this transform space free of an explicit focus step.

It is further contemplated that the various processes herein can be subjected to calibration procedures prior to runtime operation. Various 3D calibration procedures, such as those applicable to a 3D camera arrangement can be applied to a version of the light field image data. By way of background, a technique for calibration 3D cameras is described in commonly assigned, published U.S. Patent Application No. 2007/0081714 A1, entitled METHODS AND APPARATUS FOR PRACTICAL 3D VISION SYSTEM, the teachings of which are incorporated herein by reference.

It should be clear that the use of a light field camera and the associated technology available to those of skill can provide a variety of highly useful and effective solutions in the machine vision art. This technology can be applied over a wide range of vision system tasks and can enable results that in some instances are not readily achievable using conventional camera technology. Moreover, the embodiments herein desirably provide a vision system camera assembly that affords the benefits of an EDOF arrangement with fewer disadvantages. This camera assembly enables sufficiently detailed and sharp images to be obtained. It can generally operate in a variety of illumination environments. It can produce usable results when imaging object surfaces at non-perpendicular orientations with respect to the camera optical axis and desirably allows for various details at differing focal distances to be imaged and differentiated (i.e. distinguished, if needed, between in-focus and out of focus areas).

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the term "automatic" shall mean, in a manner generally free of human input or intervention and acting upon data stored in and acted upon by an electronic processor. Moreover, while the processes and structures described herein are applied to vision system tasks it is contemplated that the processes herein (e.g. extended depth of focus processes) can be employed in similar tasks, such as biometrics and/or facial recognition. Furthermore, the ability to determine depth information can be used in a variety of motion-detection applications—for example a sensor that determines in 3D whether an object is present or absent and/or a door-open sensor that discriminates between a shadow passing by and an individual moving toward the door. Also, while a single vision system camera assembly employing light field technology is described herein, it is expressly contemplated that the "camera assembly" can comprise a plurality of light-field-based vision system cameras that operate in conjunction, each acquiring images of at least a portion of the scene. Likewise, as used herein various directional and orientation terms such as "vertical", "horizontal", "up", "down", "bottom", "top", "side", "front", "rear", "left", "right", and the like, are used only as relative conventions and not as absolute orientations with respect to a fixed coordinate system, such as gravity. Accordingly, this description is meant to be taken only by way of example, and not to otherwise limit the scope of this invention.

What is claimed is:

1. A vision system for imaging an object in a scene comprising:
    a vision system camera having an optics assembly, comprising a full aperture lens assembly and a microlens array, and a light field sensor assembly constructed and arranged to generate light field image data from light received through the optics assembly, the light field image data comprising data corresponding to a plurality of groupings of central pixels for each microlens of the microlens array, wherein the microlens array is interposed between the full aperture lens assembly and the light field sensor assembly;
    a light field process that analyzes the light field image data and that generates two sets of focused image information of a plurality of layered features located at least two discrete focal distances with respect to a reference plane of the imaged object such that the light field process generates a first set of focused image information by identifying regions of interest corresponding to a first plurality of layered features located at a first discrete focal distance and filters out and omits from the first set of focused image information second plurality of layered features corresponding to a second discrete focal distance and generates a second set of focused image information by identifying regions of interest corresponding to the second plurality of layered features located at the second discrete focal distance and filters out and omits from the second set of focused image information the first plurality of layered feature corresponding to the first discrete focal distance; and
    a vision system processor that operates a vision system process on the two sets of focused image information to generate results therefrom.

2. The vision system as set forth in claim 1 wherein the layered features at each of the plurality of heights each respectively comprise ID features and the vision system process includes an ID-reading and ID-decoding process.

3. The vision system as set forth in claim 2 wherein the layered features define a portion of the object having a 3D region of interest in the vision system process that is resolved into a focused 2D image.

4. The vision system as set forth in claim 1 wherein the focused image information comprises image information of features of the object from at least a first point of view, selected from a range of points of view.

5. The vision system as set forth in claim 4 wherein the selected first point of view is selected to filter out at least one undesirable optical effect that is based upon at least one of specular reflection, occlusion, non-uniformity and shadowing.

6. The vision system as set forth in claim 4 wherein the focused image information comprises image information of features of the object from at least a second point of view, selected from the range of points of view, and wherein 3D depth information is generated based upon the selected first point of view and the selected second point of view.

7. The vision system as set forth in claim 1 wherein the vision system process includes an OCR process on raised characters.

8. The vision system as set forth in claim 1 wherein the vision system process includes at least one of registration, alignment, robot manipulator control, inspection, 2D pattern recognition, and 3D pattern recognition.

9. The vision system as set forth in claim 1 wherein the object includes a surface defining a relative tilt and the focused image information includes image information that resolves the surface into an arbitrary 2D orientation.

10. The vision system as set forth in claim 1 further comprising an ID-reader housing constructed and arranged to be handheld and containing the optics, the sensor assembly and at least a portion of the vision system processor.

11. The vision system as set forth in claim 1 further comprising a sensor assembly that acquired an image of the object, the sensor assembly that generates image data, the image data being processed based upon range data contained in the selected image information.

12. The vision system as set forth in claim 11 wherein the image data is higher in resolution than image data generated by the light field sensor assembly.

13. The vision system as set forth in claim 1 wherein the focused image information includes a 3D model of at least a portion of the object.

14. The vision system as set forth in claim 1 wherein the focused image information is a focused image of a structured light projected on a surface of the object.

15. The system as set forth in claim 14 wherein the focused image information includes information on a plurality of points of view of the surface from a range of points of view, the plurality of points of view reducing occlusion of line features.

16. The system as set forth in claim 1 wherein the light field sensor assembly is constructed and arranged to be removably attached to and operatively connected with the camera assembly, and further comprising a conventional sensor assembly constructed and arranged to be removably attached to and operatively connected with the camera assembly.

17. A method of performing vision system processes on an object in an imaged scene comprising:
    acquiring an image of the object with a vision system camera having an optics assembly, comprising a full aperture lens assembly and a microlens array, and a light field sensor assembly and generating light field image data from light received through the optics assembly, the light field image data comprising data corresponding to a plurality of groupings of central pixels for each microlens of the microlens assembly, wherein the microlens array is interposed between the full aperture lens assembly and the light field sensor assembly;
    analyzing the light field image data and generating two sets of focused image information of a plurality of layered features located at at least two discrete focal distances with respect to a reference plane of the imaged object;
    generating the first set of focused image information by identifying regions of interest corresponding to the first plurality of layered features located at a first discrete focal distance and filtering out and omitting from the first set of focused image information a second plurality of layered features corresponding to a second discrete focal distance;
    generating a second set of focused image information by identifying regions interest corresponding to the second plurality of layered features located at the second discrete focal distance and filtering out and omitting from the second set of focused image information the first plurality of layered features corresponding to the first discrete focal distance, operating a vision system process on at least one of the two sets of focused image information to generate results therefrom; and reading and decoding at least one ID provided on the object.

\* \* \* \* \*